United States Patent [19]

Pratt

[11] Patent Number: 4,815,042
[45] Date of Patent: Mar. 21, 1989

[54] PROGRAMMABLE APPARATUS AND METHOD FOR DELIVERING MICROINGREDIENT FEED ADDITIVES TO ANIMALS BY WEIGHT

[75] Inventor: William C. Pratt, Canyon, Tex.

[73] Assignee: Micro Chemical, Inc., Amarillo, Tex.

[21] Appl. No.: 137,501

[22] Filed: Dec. 22, 1987

Related U.S. Application Data

[63] Continuation-in-part of Ser. No. 833,904, Feb. 26, 1986, Pat. No. 4,733,971.

[51] Int. Cl.$^4$ .............................................. B01F 15/04
[52] U.S. Cl. ....................................... 366/141; 141/83; 141/104; 222/57; 366/152; 414/21; 414/294
[58] Field of Search ............... 366/141, 150, 151, 152, 366/154, 160, 161, 162, 165, 16, 17, 18, 19, 20, 21; 141/83, 104, 239, 8; 414/21, 294, 282; 222/57, 77

[56] References Cited

U.S. PATENT DOCUMENTS

| | | |
|---|---|---|
| 2,587,531 | 2/1952 | Saxe . |
| 2,608,394 | 8/1952 | Williamson . |
| 2,873,955 | 2/1959 | Sauer . |
| 2,877,524 | 3/1959 | Bishop . |
| 2,893,602 | 7/1959 | Barver et al. . |
| 3,203,591 | 8/1965 | Daulton et al. . |
| 3,437,075 | 4/1969 | Hawes, Jr. et al. . |
| 3,498,311 | 3/1970 | Hawes, Jr. . |
| 3,595,328 | 7/1971 | Griem, Jr. . |
| 3,670,923 | 6/1972 | Hawes et al. . |
| 3,720,185 | 3/1973 | Aldous et al. . |
| 3,806,001 | 4/1974 | Pratt . |
| 3,822,056 | 7/1974 | Hawes et al. . |
| 3,959,636 | 5/1976 | Johnson et al. . |
| 4,034,847 | 7/1977 | Hayuyuki ............................ 366/141 |
| 4,117,954 | 10/1978 | Pelletier . |
| 4,181,097 | 1/1980 | Betsuno . |
| 4,272,824 | 6/1981 | Lewinger ............................ 366/141 |
| 4,418,771 | 12/1983 | Henry et al. . |

OTHER PUBLICATIONS

*Feed Management Magazine*, vol. 36, No. 3, pp. 54–58, "Micro-Systems" (Mar. 1985).
"The Hough Microwang System", brochure of Hoe Kenebec International, West Hartford, Connecticut (undated).
"The Hickman Micro-System", 4-page brochure of Hickman's Micro-System, Inc. of Gordo, Alabama (undated).
"Automated Pre-Mixed System", 1-page advertisement of Agra Products International, Inc. (undated).
"All-Digital Loss-in-Weight Feeding", pp. 4–5 from a K-tron Corporation publication (undated).
"System Responsibility . . . From Bulk Storage to the Precision Metering of Dry Materials", 5 pps., Acrison, Inc., publication.
"Prater Blue Streak Feed Processor, the Accurate One", 2-page advertisement (undated).
"Weight Weigh-Tronix's Revolutionary Sfm-200 Radiation Master Stationary Feed Mixer", 2-page advertisement (undated).
*Feed Management Magazine*, vol. 37, No. 7, pp. 20, 22, 24, "Micro-Ingredient Control" (Jul. 1986).

Primary Examiner—Robert W. Jenkins
Attorney, Agent, or Firm—Klarquist, Sparkman, Campbell, Leigh & Whinston

[57] ABSTRACT

A method and apparatus whereby livestock and poultry are administered feed additives in their feed ration. The apparatus stores additive concentrates separately until just prior to use, then on demand dispenses the additive concentrates into one or more weigh hoppers for weighing therein. The weighed contents of the weigh hoppers are discharged into a liquid carrier within a mixing vessel where the dispensed additives are diluted, suspended, and dispersed by mixing. The resulting carrier-and-additive slurry is pumped to a receiving station for mixing with a feed ration. The weighing components are isolated from movements that would affect additive weight determinations during the weighing process so that accurate measurements of additive weights are obtained. Dispensing and weighing of multiple additives within a single weigh hopper are sequential. Each additive may be weighed and discharged from the hopper individually or cumulatively with other additives. With multiple weigh hoppers, dispensing, weighing and discharge of additives from the different hoppers can occur simultaneously or independently. A programmable control can program the apparatuses for dispensing either entirely on a weight basis, partly on a weight basis and partly on a metering basis, on a weight-compensated metering basis, or entirely on a metering basis if the weighing means malfunctions.

18 Claims, 12 Drawing Sheets

PROGRAMMABLE APPARATUS AND METHOD FOR DELIVERING MICROINGREDIENT FEED ADDITIVES TO ANIMALS BY WEIGHT

RELATED APPLICATIONS

This application is a continuation-in-part of my prior copending application Ser. No. 833,904 filed Feb. 26, 1986, now U.S. Pat. No. 4,733,471, and entitled "Programmable Weight Sensitive Microingredient Feed Additive Delivery System and Method."

BACKGROUND OF THE INVENTION

1. Field of the Invention

The present invention relates to the administering of feed additives to livestock, and more particularly to a method and apparatus for supplementing the diets of livestock and poultry with feed additives such as nutrients and medicines supplied in a consumptive fluent carrier such as water.

2. General Discussion of the Background

It has long been a common practice to feed additive supplements to cattle and other livestock, including poultry. Such supplements include vitamins, minerals, proteins, enzymes, hormones, antibiotics, worm medicines, and other nutritional supplements and medications, which provide a balanced diet, protect the livestock from disease, and stimulate growth.

An early method of feeding additives to livestock involved the use of commercially prepared additive premixes. The additives were premixed together in dry form, with some dry diluting filler material, and then stored at the feedlot for a period of time until ready for use. The premix was either mixed with the feed ration before delivery to the animals or spread on the feed at the feed trough. Premixes suffer the drawbacks of being costly to buy, store and administer. They are difficult to mix evenly with the feed, and additives of different densities tend to segregate in premixes, increasing the chances that specific animals will receive too much or too little of a given additive. Too much of especially toxic additives can have dangerous or even lethal consequences.

Additives also tend to lose their potency in premixes through physical or chemical breakdown, especially if stored for a long period of time under changing environmental conditions in combination with other additives. Therefore, there is no assurance that livestock receive their intended dosages of specific additives when the additives are administered in premixes.

Premixes also limit the choices of additive combinations that livestock feeders can feed their animals to those combinations available commercially. They also limit a feedlot's flexibility to feed different groups of animals different combinations and dosages of additives to meet their differing needs.

Many of the foregoing problems were solved by the methods and apparatus of U.S. Pat. Nos. 3,437,075 3,498,311; 3,822,056; 3,670,923; and 3,806,001, which are commonly assigned to the owner of the present application. These patents disclose various methods and apparatus for separately dispensing at the feedlot, separately stored livestock feed additive concentrates into a flow of fluent carrier material for dilution, dispersion and suspension, and for transporting the resulting slurry into livestock drinking water or feed rations shortly before the time of intended consumption. Each of these methods and apparatus, however, meter the desired amount of each feed additive on a volumetric basis. Volumetric metering can be inaccurate because of changes in the densities of additive concentrates caused by variations in humidity, particle size, moisture content, flow characteristics, temperature, oil content and other factors. Even minor inaccuracies in the amount of additive concentrates dispensed can cause serious problems, since some of the additives are very potent, toxic drugs. Typically, only 10 to 100 grams of a given additive concentrate are dispersed in a ton of feed. Volumetric metering is only accurate to within 1-2% even under the best of conditions.

Therefore, there is a need for a more accurate method and means for dispensing additive concentrates in systems for delivering additives into feed rations at the feedlot, just before the time of intended consumption of the ration. One potentially more accurate approach is to dispense additive concentrates by weight rather than volume. It is believed that at least one weigh-type additive concentrate delivery system has been tried, but unsuccessfully. It is believed that such system weighed and then dispensed each additive separately and sequentially. It is believed that such system was unsuccessful because it was too slow and too inaccurate for handling additive concentrates in a feedlot environment.

U.S. Pat. Nos. 2,893,602 and 3,595,328 disclose machines for weighing batch amounts of aggregate mixtures such as asphalt. Each of these machines uses a scale or strain gauge to measure the amount of bulk material dispensed from a storage container. These systems are only suitable, however, for making the gross kinds of measurements needed in dispensing and mixing bulk materials such as aggregates for making asphalt or concrete, and feed grains for making feeds in commercial feed mills. The weighing components of these machines, for example, are not able to weigh gram amounts of materials as would be required for additive concentrate dispensing in feedlots. Even if they were able to make such fine measurements, their scales would be affected by environmental conditions commonly found at feedlots such as wind and movement of machine components that would adversely affect their accuracy to an unacceptable extent. Finally, these devices would lose accuracy progressively because of a buildup of residue of aggregate particles in their weighing containers during use. They would therefore be unsuitable for dispensing additive concentrates in a feedlot environment.

Accordingly, a primary object of the present invention is to provide a new and improved method and means for dispensing and delivering feed additive concentrates in various combinations and dosages to livestock using primarily weight-controlled rather than volumetric dispensing of additive concentrates.

Another primary object is to provide a new and improved method and apparatus for dispensing and delivering combinations of feed additive concentrates in a liquid slurry to a livestock feed ration at feedlots which is more accurate than prior such methods and apparatus.

Another object is to provide a method and apparatus as aforesaid which can be operated selectively either on a weight or volumetric basis.

Another object is to provide a method and apparatus as aforesaid that can be used effectively in a feedlot environment.

Still another object is to provide such an apparatus and method with an improved control system that can be controlled by a central processing unit that can be quickly and conveniently programmed to meet the varying needs of a given feedlot and different feedlots.

Another object is to provide a method and apparatus that are flexible in enabling the dispensing and weighing of two or more additives either simultaneously or cumulatively, or both, and in enabling the discharge of each weighed additive into a diluting liquid carrier either individually before other additives are weighed or together with other weighed additives.

Finally, it is a specific object of the invention to provide a method and apparatus as aforesaid which can accurately dispense gram amounts of potent microingredient additive concentrates to accuracies within 0.5 grams.

SUMMARY OF THE INVENTION

The aforementioned objects are achieved by providing a method and apparatus for measuring, dispensing, and delivering different combinations and proportions of microingredient feed additive concentrates on primarily a weight basis in small but accurate amounts, into a liquid carrier. The carrier and concentrates form a slurry which is delivered into a livestock or poultry feed ration shortly before the feed ration is delivered to the animals for consumption. The apparatus includes multiple dry and liquid additive concentrate storage means for storing the various additive concentrates separately at the feedlot. A plurality of separate dispensing means, such as conveyor screws for the dry additives and pumps for the liquid additives, dispense separately and without intermingling the additive concentrates from each of the storage means into a receiving means such as separate compartments of a hopper or multiple weigh hoppers. Weighing means are provided for determining the weights of the different additives dispensed and for stopping the dispensing of each additive when a predetermined weight of that additive has been dispensed. The weigh means, for example, may comprise a weigh scale means supporting each weigh hopper or supporting the storage means.

In a preferred embodiment shown and described, the weigh hopper is scale-mounted, and the additives are dispensed and weighed sequentially and cumulatively as they are added to the weigh hopper. Isolating means isolate the weighing means from movements affecting its weighing function so that accurate weight determinations are obtained. A control means, such as a central processing unit, controls separately the operation of each dispensing means to dispense a given microingredient additive from a given storage means until a predetermined weight of that microingredient has been dispensed and weighed. When all selected additive concentrates have been dispensed into the weigh hopper and weighed, the hopper deposits its contents into a liquid carrier within another portion of the receiving means comprising a mixing vessel. The liquid carrier and additive concentrates are intermixed in the mixing vessel to dilute, dispense and suspend the additives in a liquid slurry. The slurry is then delivered to a receiving station where it is either sprayed directly into and mixed with a feed ration or held for subsequent addition to a feed ration.

The control means of the apparatus includes means for operating the apparatus either in a weigh mode, or, for example, if the weigh means is inoperative, in a volumetric dispensing mode.

The control means may include a programmable controller, programmable to cause the apparatus to dispense microingredients either entirely on a weight basis, partly on a weight basis and partly on a volumetric (metering) basis, on a weight-compensated metering basis, or entirely on a metering basis if, for example, the weighing means malfunctions.

The isolation means may include a separate, independently mounted and isolated weigh subframe assembly for the weighing components of the apparatus. Within the subframe assembly, scale components may be further isolated from other components. Further isolation may be provided by an independent main frame surrounding the subframe and protecting it from external forces by protective panels.

The weigh means may include multiple weigh hoppers, each for weighing one or more different additives. Different additives may be dispensed into the multiple weigh hoppers and weighed simultaneously to speed up the makeup of a batch formulation of additives. Where multiple additives are dispensed into each weigh hopper, the hopper may be discharged after each additive is weighed or only after all additives are weighed cumulatively.

Where multiple weigh hoppers are used, each includes its own independent weighing means to enable weighing of multiple additives to occur simultaneously. Each weighing means includes a scale head that takes a weight reading many times per unit of time, averages such readings, and then transmits the averaged reading to the central processing unit only once during the same unit of time, thereby minimizing the effects of any erroneous weight reading induced by extraneous or other transient factors.

BRIEF DESCRIPTION OF THE DRAWINGS

The above and other objects and advantages of the present invention will become more apparent from the following detailed description which proceeds with reference to the accompanying drawings wherein.

DETAILED DESCRIPTION OF PREFERRED EMBODIMENTS

Introduction

The microingredient feed additive concentrates of the present invention include such potent substances as hormones, antibiotics, and vitamins that are typically administered to cattle and poultry at feeding operations, such as cattle feedlots, in gram amounts or less. It is often essential that a prescribed amount of a microingredient be delivered to an animal, and no more. Too little of a microingredient has no effect, while too much of it may be toxic or fatal. The range between too much or too little of some additives is often no more than 0.5 gram. The apparatus and method disclosed in this detailed description is intended to accurately dispense dry and liquid additive concentrates within this range of accuracy.

General Assembly

Figure 1:
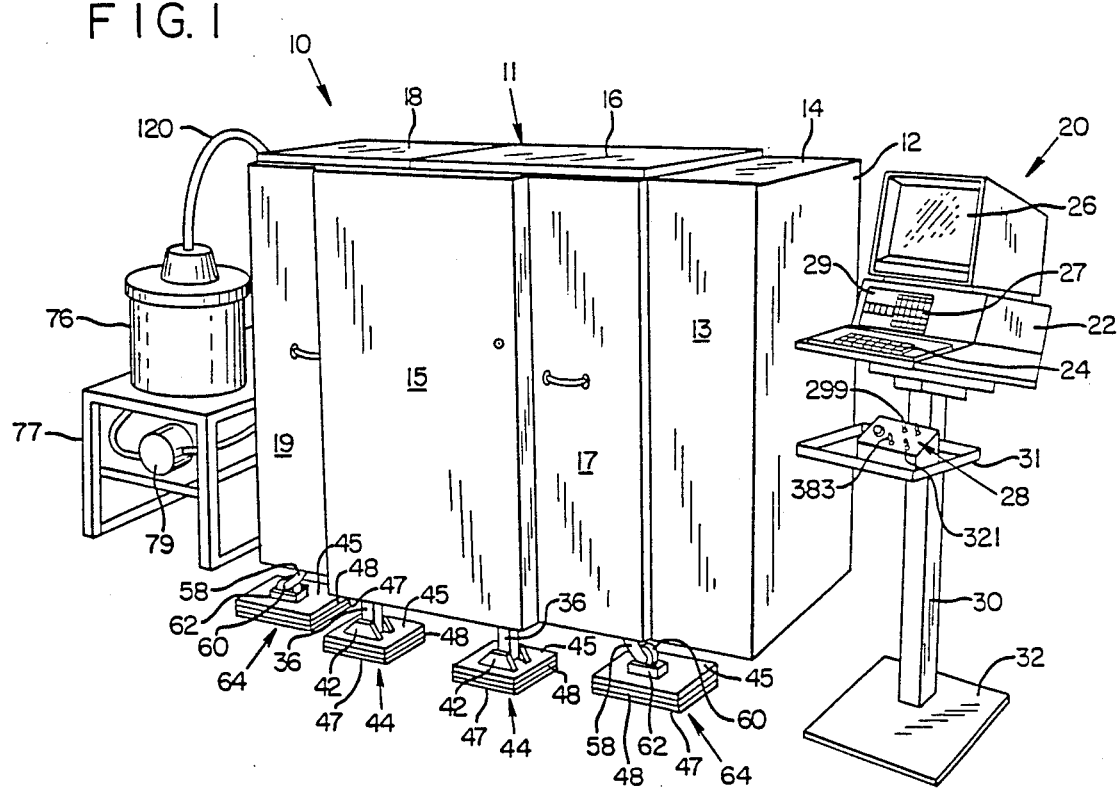
FIG. 1 is a perspective view showing the major components of an apparatus in accordance with the present invention.

With reference to the drawings, FIG. 1 illustrates an apparatus shown generally at 10 for measuring, dispensing, and delivering microingredient feed additive concentrates in small but accurate proportions in a liquid carrier slurry to livestock shortly before delivery of the feed ration to the animals for consumption. The apparatus 10 includes several separate components including a main cabinet 11, and a remote control unit 20, shown for convenience near cabinet 11 but normally located at a remote control station such as at a feed truck filling station in a feedlot Additional separate components include multiple liquid additive concentrate storage containers 76, 78 (only one being shown in FIG. 1) supported on a stand 79, and their dispensing pumps 79 (see FIG. 2). Typically, a separate water supply tank 195 (FIG. 14) supplies the necessary carrier and flush water to the cabinet through fill and flush conduits (FIG. 10), via a booster pump 193 (FIG. 14).

Figure 14:
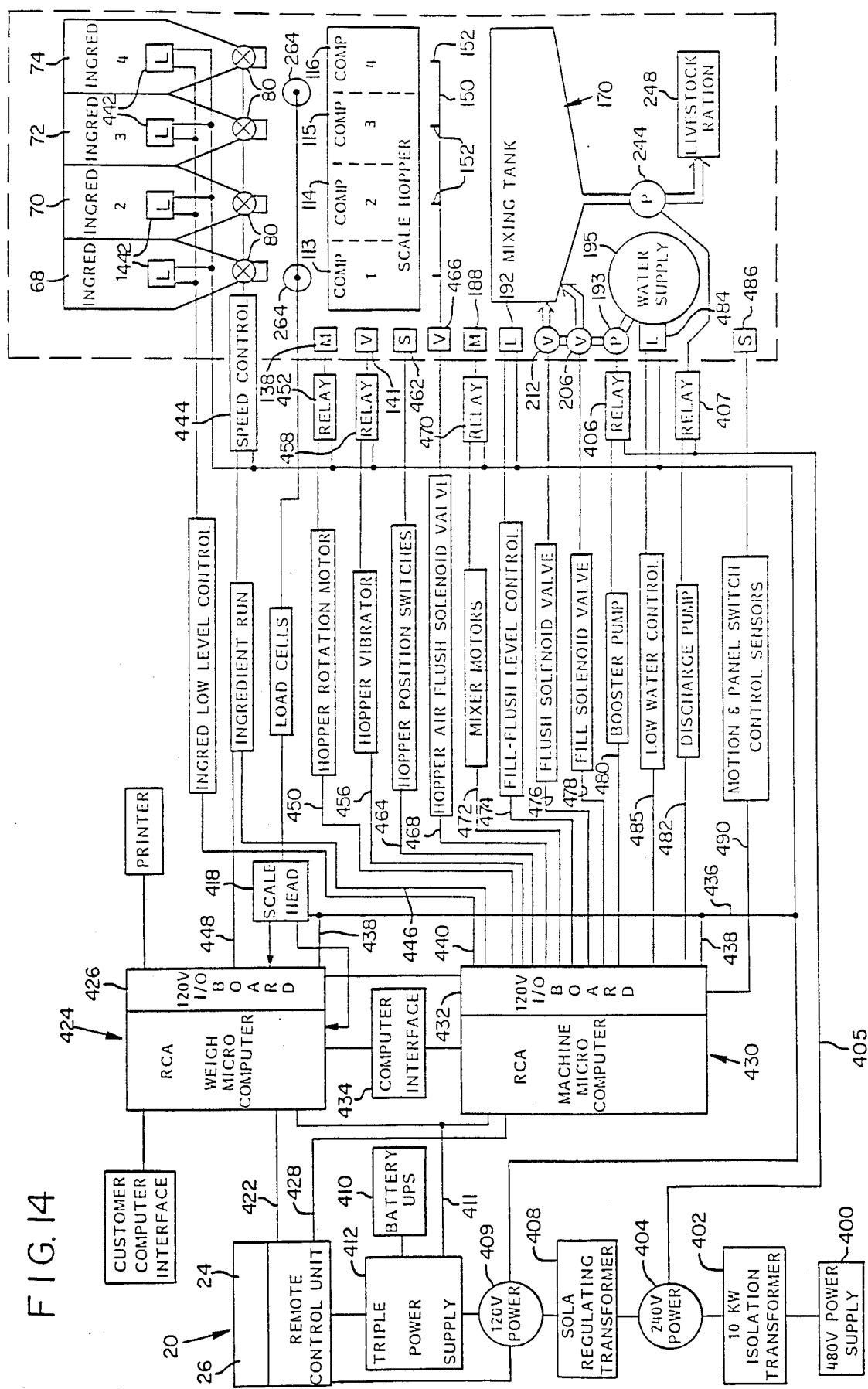
FIG. 14 is an electrical control schematic diagram for the illustrated apparatus.

Another separate cabinet (not shown) houses a weigh micro computer, or central processing unit, shown schematically at 424 in FIG. 14. A second microcomputer, or central processing unit, shown schematically at 430 in FIG. 14, for controlling the machine sequencing and volumetric metering functions, is housed within one end portion 13 of cabinet 11. Various speed controls and electrical relay interfaces and circuitry of the control system shown in FIG. 14 are also housed within cabinet end portion 13. Such end portion is a separate compartment of cabinet 11 that can be swung open about a hinged vertical axis for access.

Cabinet 11 houses the major mechanical components of the apparatus. The exterior of the cabinet, with its protective panels 12, completely encloses and shields such components from external dust, dirt and other contaminants common in a feedlot environment. The panels also protect the internal components, especially the weight-sensitive ones, from external forces such as wind, jarring contact, and the like, that would otherwise affect the accuracy of weight measurements.

Figure 4:
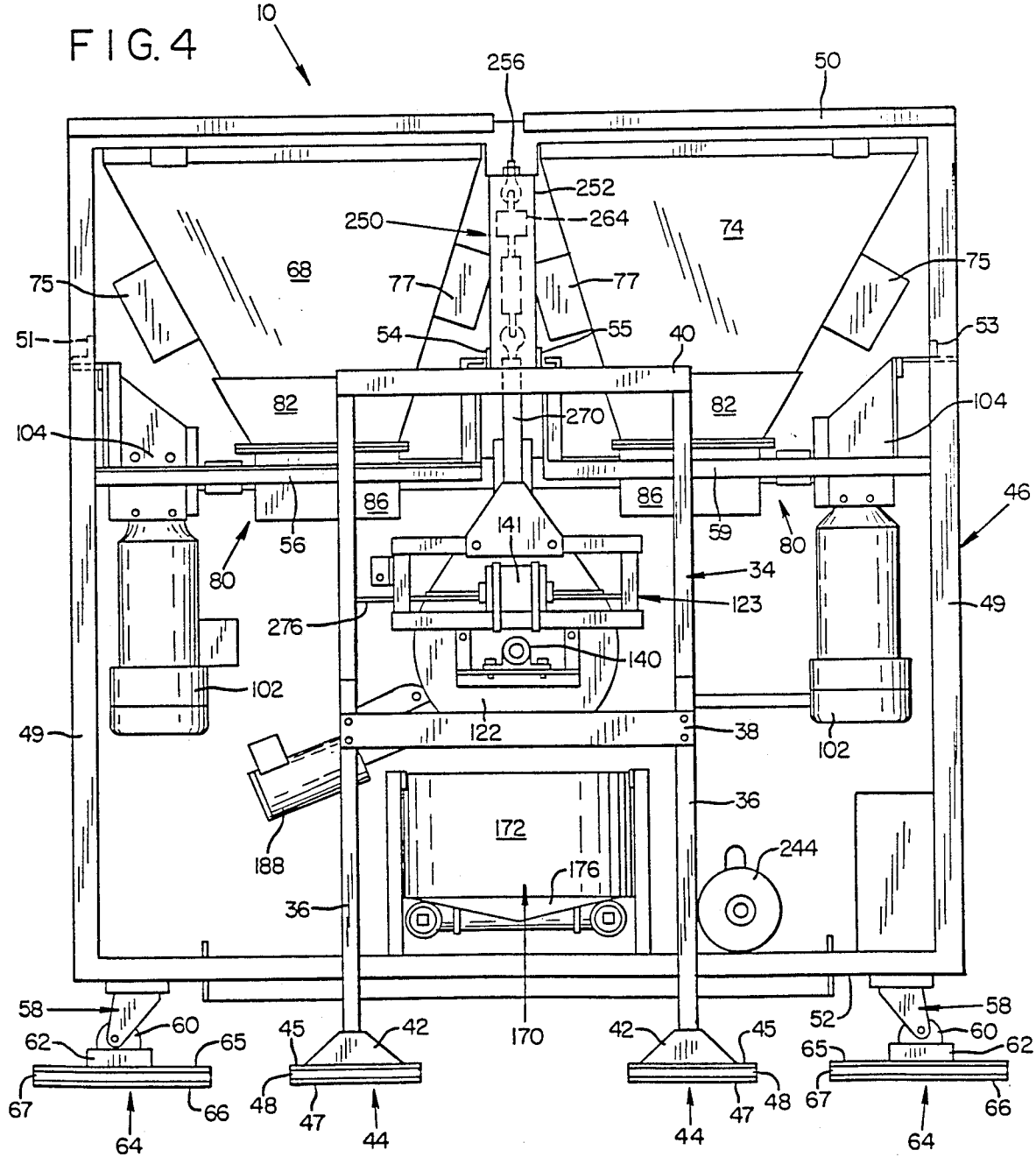
FIG. 4 is an enlarged, front elevational view of the main cabinet shown in FIG. 1, the cabinet panels having been removed to show the internal parts of the machine.

Referring to FIG. 4 showing the major components inside the cabinet 11, such components include a main frame 46 and an entirely separate and independently mounted subframe 34, each mounting certain components. Access to the components mounted on these frames is gained through access doors 15, 17, 19 in a front wall of the cabinet 11, and through hinged lids 16, 18 on a top wall of the cabinet.

In general, weigh subframe 34 mounts those components which are necessary to the weighing function of the apparatus, and main frame 46 mounts the remaining components that could, during their operation, induce undesirable movements in the weigh components to adversely affect the weighing function. Accordingly, the weigh subframe serves as a means for isolating the weigh components from internal machine movements induced through operation of components on the main frame.

The main frame components include storage bins 68, 70, 72, 74 for storing different dry additive concentrates, dry additive dispensing means 80 for dispensing additives from the storage bins, and an additive-receiving means comprising a mixing vessel or tank 170. Other main frame-mounted components include a discharge pump 244 for pumping slurry from mixing vessel 170, slurry mixers 180, and various plumbing components for supplying carrier and flush water to the mixing vessel and discharging slurry liquid from the vessel. Cabinet lids 16, 18 provide access to the storage bins for refilling them.

The subframe 34 includes an entire subassembly of weigh components, including a weigh hopper means comprising the compartmented weigh hopper 122, and a suspension means for suspending the weigh hopper from a weighing means 250. The suspension means includes a pair of suspension frames 123, one at either end of the weigh hopper. Each such frame rotatably supports weigh hopper 122. Each suspension frame 123 includes a suspension arm 270 suspending the suspension frame from the weigh means 250. The weigh means includes, at each end of the subframe 34, a weigh tower 252 projecting upwardly from the subframe and suspending therein a load cell 264. The load cell in turn suspends the weigh hopper through an appropriate connection to suspension arm 270 of suspension frame 123.

Remote control unit 20 includes a computer terminal 22 supported on a stand 30 having a base plate 32. Terminal 22 includes a primary keyboard 24, a primary display screen 26, a small, secondary keyboard 27 and a small, secondary display screen 29. Various control switches and indicators are provided on a control switch box 28 mounted on a shelf 31 of the stand below the terminal 22.

Weigh Frame Subassembly

Figure 5:
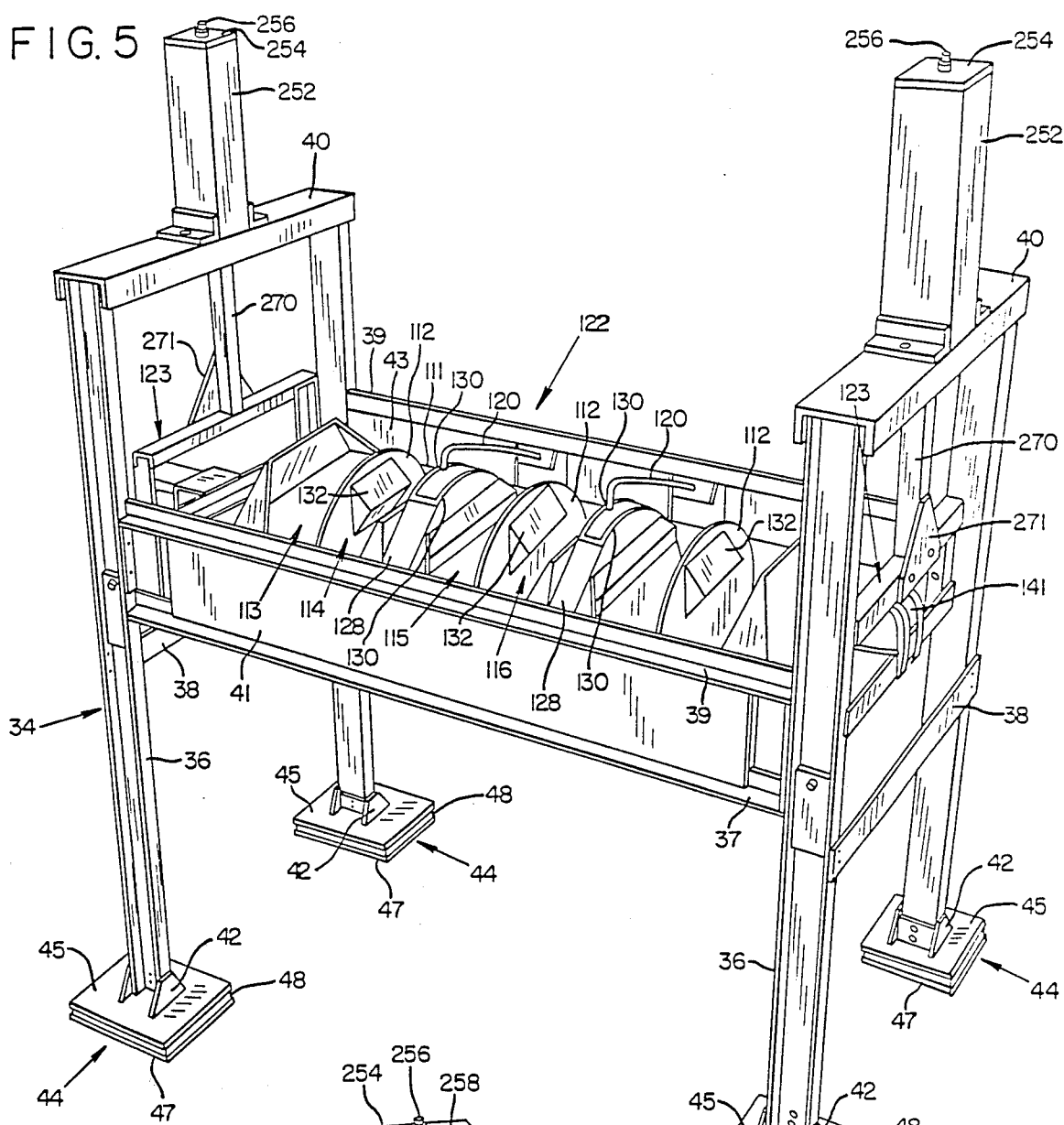
FIG. 5 is an enlarged, perspective view of the weigh frame subassembly of the apparatus shown in FIG. 4.

Apparatus 10 is seen therein and in FIG. 5 to comprise a weigh frame 34 having four uprights 36 and two each of parallel crossbeams 38, 40 and longitudinal beams 37, 39 rigidly interconnecting the four uprights 36. A vertical slat 41, 43 is carried between each pair of beams 37, 39. Each of uprights 36 has an enlarged foot 42 to enhance the stability of weigh frame 34. Each foot 42 is mounted on an elastomeric isolation pad 44 (FIG. 3) which absorbs vibrations or other environmental influences that may affect the accuracy of the functions performed by weigh frame 34. Each pad 44 includes a square upper plate 45 to which foot 42 is secured, the upper plate having a peripheral, downwardly depending flange which forms an enclosure. A square lower plate 47 is attached to a floor with bolts below plate 45 and has a peripheral, upwardly extending flange that forms an enclosure. A rubber cushion 48 is placed between plates 45, 47 within the enclosures formed by the flanges on the plates. Cushion 48 is thick enough to maintain the upwardly and downwardly extending flanges in spaced relationship so that vibrations are not communicated between plates 45, 57.

Main Frame Subassembly

Separate mounting or main frame 46 substantially surrounds weigh frame 34, the mounting frame 46 comprising four uprights 49 interconnected by four top support beams 50 and four bottom support beams 52. Two intermediate parallel support beams 51, 53 extend across opposing parallel faces of frame 46, and two parallel support beams 54, 55 extend across the middle of frame 46 parallel to beams 51, 53. A pair of parallel, U-shaped brackets 56, 57 are fixed to and suspend from beams 51, 54 (FIG. 8), and a pair of similar U-shaped brackets are fixed to and suspend from beams 53, 55. Only one U-shaped bracket 59 is shown in FIG. 4, although it will be understood that a second, parallel U-shaped bracket extends between beams 53, 55 in an arrangement similar to that shown in FIG. 8 for U-shaped brackets 56, 57.

Figure 3:
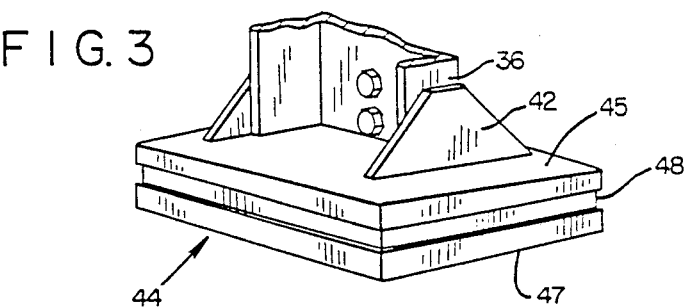
FIG. 3 is an enlarged, perspective view of a typical foot portion and isolation pad of a support leg of the apparatus of FIG. 1.

Mounting frame 46 is supported by casters 58 each having a roller 60 that is received within a cup 62 that is attached to an isolation pad 64 which is similar in structure to pad 44 shown in FIG. 3. Pad 64 comprises a top plate 65 having a peripheral, downwardly depending flange and a bottom plate 66 bolted to the floor and having a peripheral, upwardly extending flange. A rubber cushion 67 is positioned between plates 65, 66 within the enclosures formed by their peripheral flanges, the width of cushion 67 being great enough to keep the peripheral flanges in spaced relationship to one another and avoid metal to metal contact which might transfer vibrations.

Figure 2:
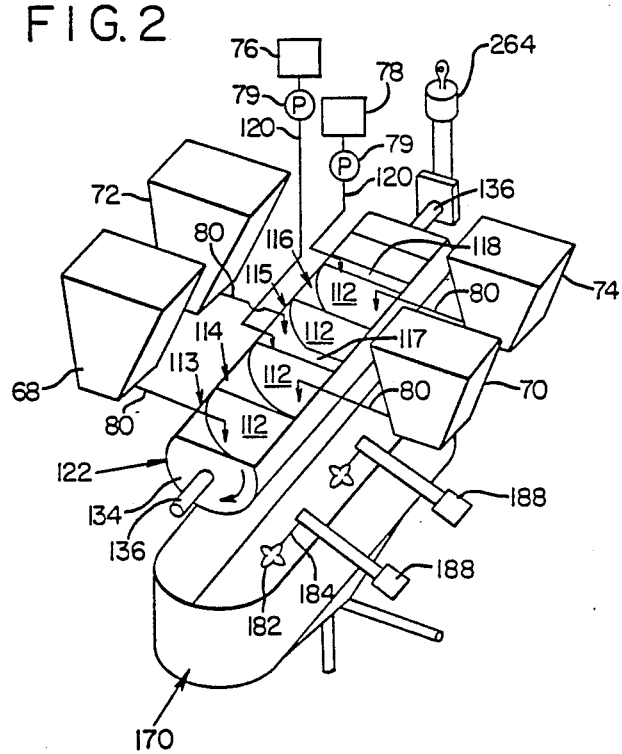
FIG. 2 is a schematic perspective view illustrating the internal components of the main cabinet shown in FIG. 1.

FIGS. 2 and 4 show multiple storage means such as dry additive concentrate storage bins 68, 70, 72, and 74 for storing separately a plurality of different dry microingredient feed additive concentrates. Each of the bins has a square top opening and square bottom opening, the bottom opening having a smaller area than the top opening such that the cross-sectional area of each bin diminishes in the direction of the bottom opening. A pair of vibrator motors 75, 77 (FIG. 4) are placed on each bin 68–72 to assist in moving dry microingredient concentrates out of the bins during dispensing.

A plurality of liquid containers 76, 78 are also shown in FIG. 2 for storing separately different liquid microingredient feed additive concentrates. The liquid containers are supported on a table 79 (FIG. 1) adjacent cabinet 11 and connected to the apparatus through flexible tubes described later.

A separate dry dispensing means 80 is provided for each dry bin 68–74. A separate liquid dispensing means 120 is provided for each liquid container 76–78. Each liquid and dry dispensing means is independently operated and controlled for dispensing separately several selected additive concentrates from their respective bins and liquid containers in predetermined weights during a machine operating cycle.

Figure 8:
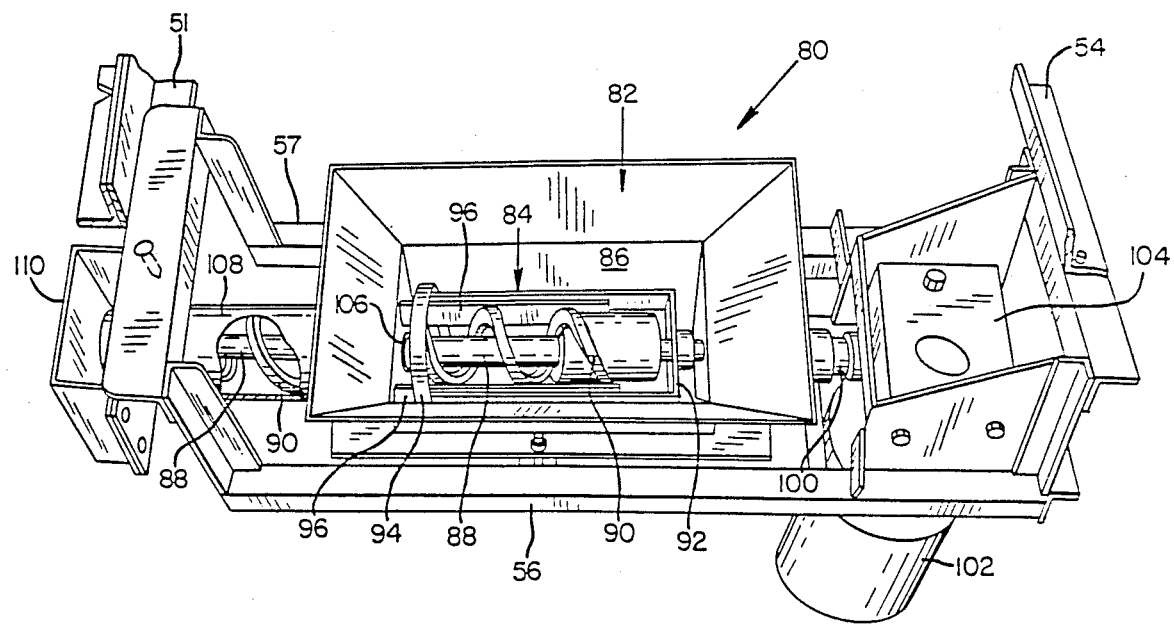
FIG. 8 is a fragmentary top perspective view of a dry additive dispensing means portion of the apparatus of FIG. 4, shown mounted on the main frame assembly of FIG. 4.

One of the dry dispensing means 80 for a dry microingredient is shown best in FIGS. 4 and 8. It includes an annular collar 82 having a square cross section. The collar fits closely about the open bottom of a bin 68–74 and extends partially up its sidewalls. Collar 82 has a square frusto-pyramidal configuration which defines a flow passageway of progressively decreasing cross section from the bottom bin opening to a top opening into a coreless metering screw assembly 84 within a rectangular lower extension section 86 of collar 82 having a curved bottom. Screw assembly 84 includes a rotatable core 88 which carries a helical metal screw 90 and rectangular screw agitator 92 with a circular band 94 around one end thereof. A stationary rear one-half tube extension 96 of a conveyor tube 108 projects into the interior of agitator 92 to start the conveyance of material that is moved by the screw 90 into conveyor tube 108. Agitator 92 helps maintain a uniform microingredient density around rotating screw 90.

Agitator 92 is rotated by a shaft 100 which is driven through a right-angle gear box 104 by a variable-speed motor 102, with three pre-set speeds. Core 88 and screw 90 project through opening 106 and into conveyor tube 108 having an open end that terminates adjacent a deflection plate 110 above the top opening of weigh hopper 122. Thus the metering screw assembly conveys additive from the supply bin into a compartment of the weigh hopper.

Each of liquid containers 76, 78 is provided with a separate dispensing means 120. Each liquid dispensing means is, for example, a variable-speed or displacement rotary or piston pump 79 (FIG. 2). The liquid dispensing means pumps liquid additive from a container 76, 78 through a flexible feed conduit which connects to a rigid dispensing tube end 120 (FIG. 5) on the weigh subframe to deliver the additive into a liquid compartment 117-118 of weigh hopper 122.

The hopper 122 (FIGS. 2, 4, 5, and 7) is carried by weigh subframe 34 between frame slats 41, 43 below the open end of extension tube 108 of screw conveyor 80. Hopper 122 is an elongated trough having a substantially semicylindrical cross section and a plurality of partitions 112 which divide the hopper transversely into several dry microingredient receiving compartments 113, 114, 115, 116. Each of the dry compartments 113-116 is provided with a deflector 132 on its partition wall having a triangular cross section that directs additive concentrates to the interior of the compartments during both filling and emptying of the hopper.

Additional partitions 111 of hopper 122 cooperate with some partitions 112 and upper walls 128 to define liquid additive-receiving compartments 117, 118 having narrow openings 130 into which liquid dispensing tubes 120 direct liquid additives from containers 76, 78.

The liquid and dry additive compartments of hopper 122 maintain dispensed additives separated until the hopper discharges its contents, after weighing, into the diluting liquid carrier within the mixing vessel 170 positioned vertically below the hopper.

Figure 7:
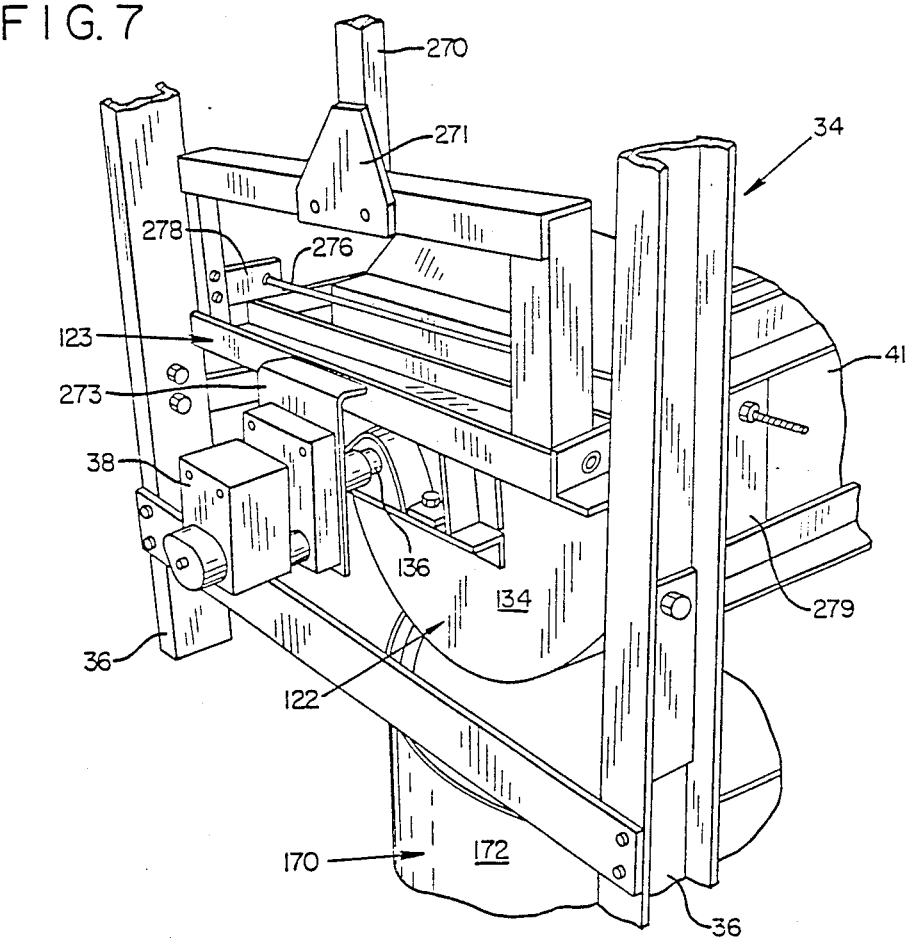
FIG. 7 is an enlarged, fragmentary perspective view of a portion of the weigh hopper subassembly of the weigh frame shown in FIG. 5.

Hopper 122 is supported by weigh frame 34 such that it is free to rotate about its longitudinal axis. Each semicircular end plate 134 (one being shown in FIG. 7) of hopper 122 is secured to a shaft 136. The shaft 136 at the hopper end shown in FIG. 7 is drivingly connected to a motor 138 that is fixed to hopper suspension frame 123 by a mounting bracket 273. The shaft at the opposite end of the hopper is mounted in a bearing 140 (FIG. 4). Motor 138 operates first to rotate hopper 122 to an inverted position for emptying (FIG. 11); then to an upright position (in the same direction) for the next dispensing and weighing cycle.

Figure 11:
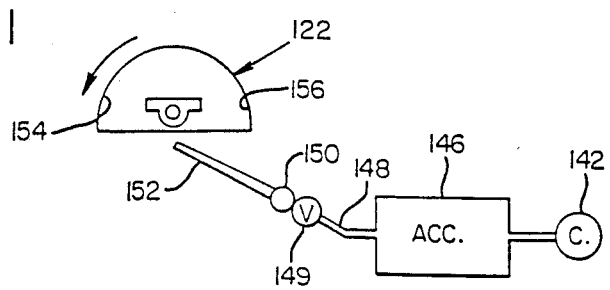
FIG. 11 is a schematic view of the air flush system for the weigh hopper portion of the apparatus.

An air flush means for compartments 113-116 of hopper 122 is shown in FIG. 11. The air flush means is carried by the main frame and comprises a compressor 142 in fluid communication through passageway 144 with air pressure accumulator tank 146. A solenoid valve 149 regulates the flow of air through passageway 148 to header 150. The header in turn fluidly communicates with a plurality of hoses 152 that project into each compartment 113-116 of hopper 122 when the hopper is inverted Each of hoses 152 is positioned to direct a stream of air against far wall 154 of the hopper. It is not necessary to direct the air stream against near wall 156 because that wall will have already been scraped relatively clean by the movement of dry additives against the wall and out of the hopper as hopper 122 rotates to an inverted position.

A vibrator motor 141 is carried by suspension frame 123 at the end of hopper 122 opposite hopper rotating motor 138. Vibrator motor 141 operates during inversion of the hopper to promote emptying of the hopper compartments by vibrating the hopper.

An elongated mixing vessel 170 which serves as a receiving means for receiving additives from the hopper 122 and also as a mixing means for mixing such additives with water, is placed below hopper 122. Vessel 170 is an elongated tub that is longer and wider than hopper 122. Vessel 170 comprises a continuous, annular upright wall 172 around a sloping bottom formed from a plurality of triangular sections 176 that slope towards a pair of central bottom openings including an inlet port 177 and discharge port 178.

Variable speed flow inducing means, such as variable two-speed mixers 180, serve as part of the mixing means and are provided in mixing vessel 170 for inducing a turbulent flow of liquid within the mixing vessel. Each mixer 180 is comprised of four angled mixing blades 182 connected to the end of a rotary mixing shaft 184 that is connected to a gearbox 186 and motor 188 for rotating shaft 184. Each of motors 188 is mounted on a motor mounting frame 190 along an outside face of vessel wall 172. Level sensors 192, 194 are also mounted over the edges of wall 172 and project downwardly into the tub for determining the level of water contained therein and shutting off a supply of water to the tub when a predetermined level is reached. Sensors 192, 194 are, for example, electrodes through which an electrical circuit is completed or a timing circuit energized when the water surface in the tub reaches the predetermined level. Sensor 192 is the primary sensor, while sensor 194 is a backup sensor which detects a near overflow condition, closes fill solenoid 206, and interrupts the fill cycle.

Figure 10:
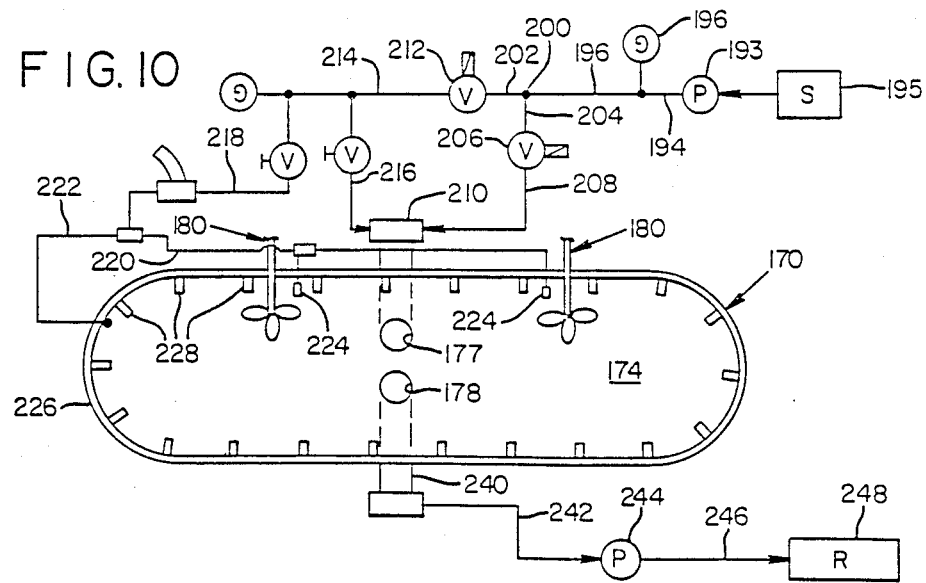
FIG. 10 is a plumbing diagram for the fluid components of the apparatus of the preceding figures.

FIG. 10 shows a plumbing system for apparatus 10 which delivers and removes carrier and flush water from vessel 170. Water is introduced from a source 195 by pump 193 through line 194 where its pressure is detected by pressure gauge 196. Water then continues to flow through line 198 where it is divided by tee 200 into water lines 202, 204. The flow of water through fill line 204 is controlled by solenoid valve 206 which, when open, allows water to flow through line 208, thence to conduit 210 and into vessel 170 through port 177. When solenoid valve 206 is open, a second solenoid valve 212 in line 202 remains closed such that all of the supply of water moves through line 204 to fill vessel 170.

Figure 9:
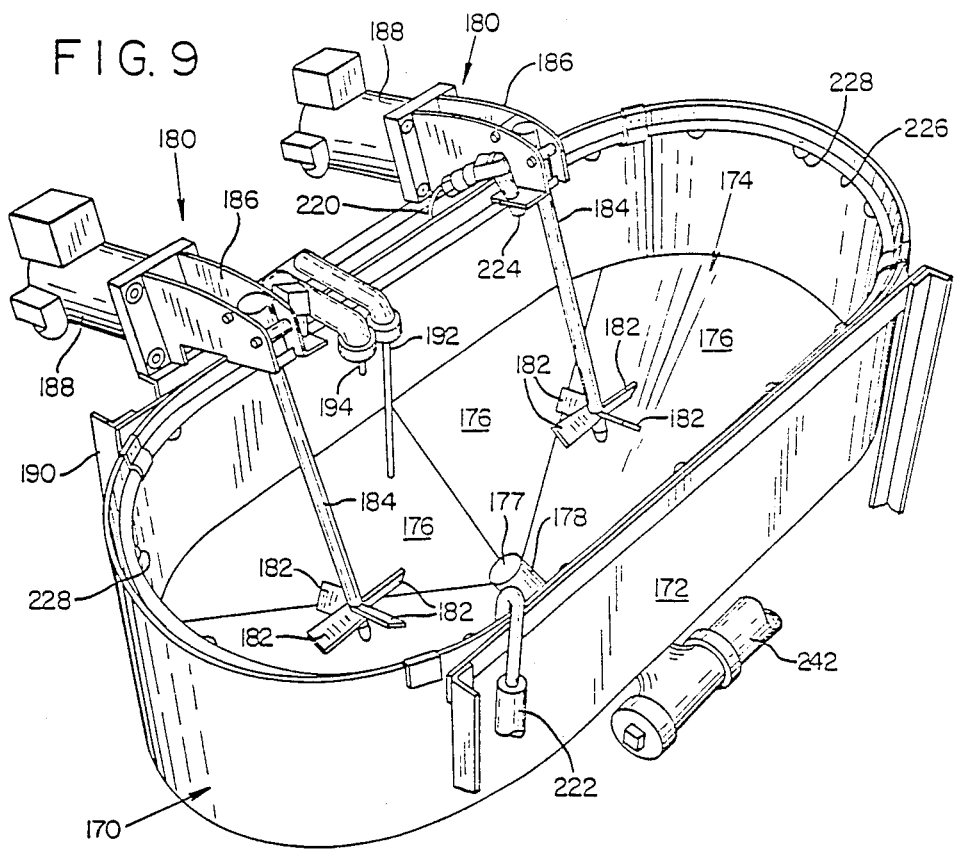
FIG. 9 is a fragmentary top perspective view of the mixing vessel and associated components of the main frame assembly shown in FIG. 4.

Solenoid valve 212 is interposed between line 202 and flush line 214 that in turn communicates with line 216 to establish fluid communication with conduit 210. Line 214 also fluidly communicates with line 218 having branches 220, 222. Branch 220 fluidly communicates with a pair of nozzles 224, one positioned above blades 182 of each mixer 180, nozzle 224 directing a flow of water onto the blades to clean them. Line 222 provides a passageway through which the water moves to flush ring 226 (FIGS. 9 and 10) which is positioned around the upper inner periphery of vessel 170 adjacent its top edge. Ring 226 has a number of flush nozzles 228 which direct a flow of water downwardly against wall 172 of vessel 170 to flush it.

Apparatus 10 also has a delivery means for delivering slurry from vessel 170 to a receiving station for mixing with an animal feed ration at a location remote from the mixing vessel. This delivery means includes discharge opening 178 in fluid communication with conduit 240 that empties into discharge line 242. Discharge pump 244 withdraws slurry through line 242 and sends it through line 246 to receiving station 248 where, typically, it is sprayed into a livestock feed ration and mixed therewith.

Weigh Means

Figure 6:
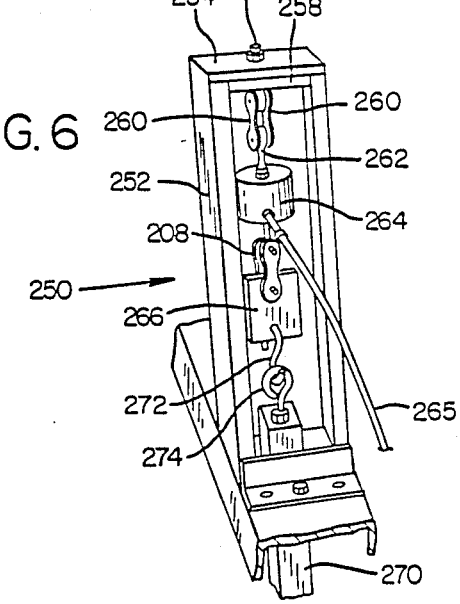
FIG. 6 is an enlarged, fragmentary, perspective view of a load cell in a weigh tower of the weigh frame of FIG. 5, the remainder of the weigh frame being broken away.

A weighing means 250 (FIG. 6) is provided on weigh frame 34 for weighing predetermined weights of the different additive concentrates dispensed from bins 68-74 and containers 76, 78. Weighing means 250 includes a weigh tower 252 extending vertically upward from a crossbeam 40 of weigh frame 34 midway between uprights 36 at each end of frame 34. Each tower 252 has a flat top plate 254 with a central opening through which the threaded shank of an eye member 256 is placed and secured with a nut. A rubber pad 258 is placed against the interior face of plate 254 before member 256 is secured to top plate 254 with the nut. A pair of suspension members 260 pivotally interconnect eye member 256 and a second eye member 262 from which a load cell 264 is suspended. The amount of strain on load cell 264 is communicated to a control unit through line 265. The load cell 264 in the preferred embodiment is capable of weighing to an accuracy of 0.5 grams.

A rubber isolator pad 266 is pivotally suspended beneath load cell 264 by suspension members 268. A suspension arm 270 of the hopper suspension frame 123 is in turn suspended from isolation pad 266 by hook 272 and eye 274 secured to arm 270. Arms 270 of suspension frames 123 thus suspend hopper 122 such that the entire weight of the hopper is freely suspended from load cells 264. Arms 270 are braced by gussets 271 to their rectangular weigh frames 123. Hopper 122 is suspended interior to frames 123 between slats 41, 43 of frame 34 by suspending shafts 136, one of which is driven (FIG. 7) and the other of which is mounted in a bearing 140 (FIG. 4). The hopper is therefore free to rotate between frames 123 to an inverted position. This arrangement allows the weight of the hopper to be transferred through frames 123 to arms 270 for acting on load cells 264. The weight of additive concentrates in hopper means 122 can therefore be accurately determined.

As best shown in FIG. 7, a transverse vibration and sway dampening rod 276 extends between a bracket 278 carried by an upright of hopper suspension frame 123 and a bracket 279 carried by two longitudinal beams 37, 39 of weigh frame 34. Such a rod 276 is provided at each end of weigh frame 34 adjacent face 134 of hopper 122 for preventing or damping transverse movements of the hopper. A similar longitudinal rod (not shown) extends along one longitudinal side of hopper 122 to prevent or dampen longitudinal vibratory or swaying movements of hopper 122, one end of the longitudinal rod being fixed to longitudinal beam 39 and the other end being fixed to weigh frame 34. Such sway dampening rods provide part of the means isolating the weight-sensitive components of the apparatus from movements that could affect accurate weight measurements.

Control Means

Apparatus 10 is provided with a control means, such as a central processing unit, for controlling the operation of apparatus 10. In the preferred embodiment, two programmed central processing units are used, one for operating the weighing functions of apparatus 10 and the other for operating all other machine functions.

Weighing Program

Figure 12:
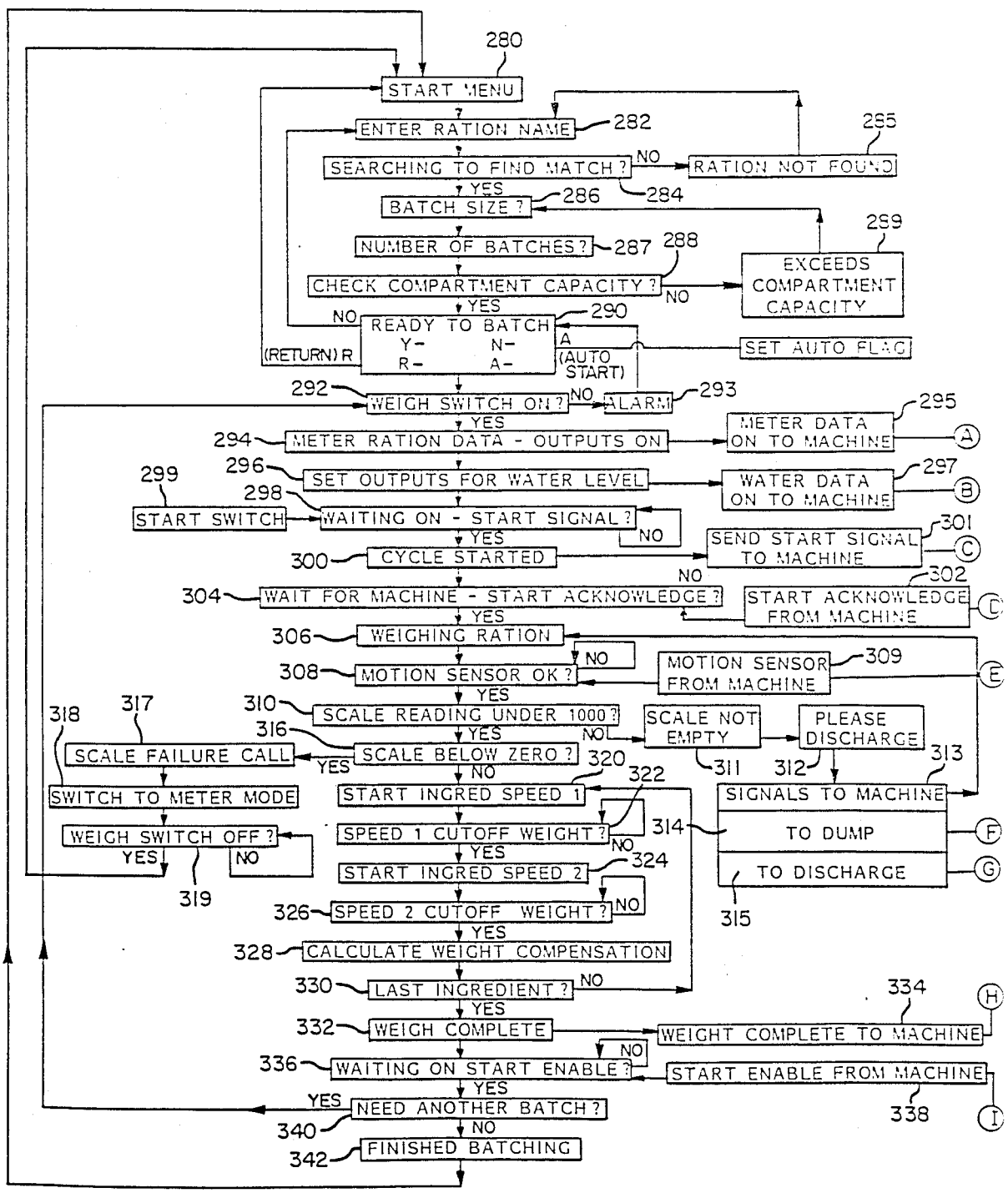
FIG. 12 is a flow diagram illustrating the logic of a computer program which controls the weigh means of the present apparatus.

The logic of the program for operating the weighing functions of the machine is shown in FIG. 12. The weighing CPU is activated by starting the menu at 280 and then entering ration data with keyboard 24 for a particular feedlot or data for one of a series of desired batches at a feedlot. The formulation of each desired batch has been preprogrammed into the computer such that a batch formulation can be chosen by entering a code number at 282. The computer then searches at 284 for a match to this encoded formulation until the match is found and the machine is ready to batch. If a match is not found, the program at 285 returns to step 280 and a prompt is sent to screen 26 to enter ration data.

Once a match is found at 284, a program prompt at 286 appears on screen 26 requesting the size of the batch to be prepared. After this information is entered, the program prompt at 287 requests the number of batches to be prepared, and if the batch size exceeds the capacity of the preprogrammed limit for the feed lot ration mixer or the compartments 113–118 of hopper 122, this is computed at 288. If capacity has been exceeded, a prompt is sent to screen 26 at box 289, and the program will request that new data concerning batch size and number be entered by returning to step 286. If capacity has not been exceeded, the machine is ready to batch at 290.

The weighing computer first checks to determine if a weigh switch is on at 292, and if the weigh switch is off, an alarm is sounded at step 293 and the program returns to ready at 290. The alarm will alert an operator that the weighing switch must be turned on in order for batching to continue.

Figure 13:
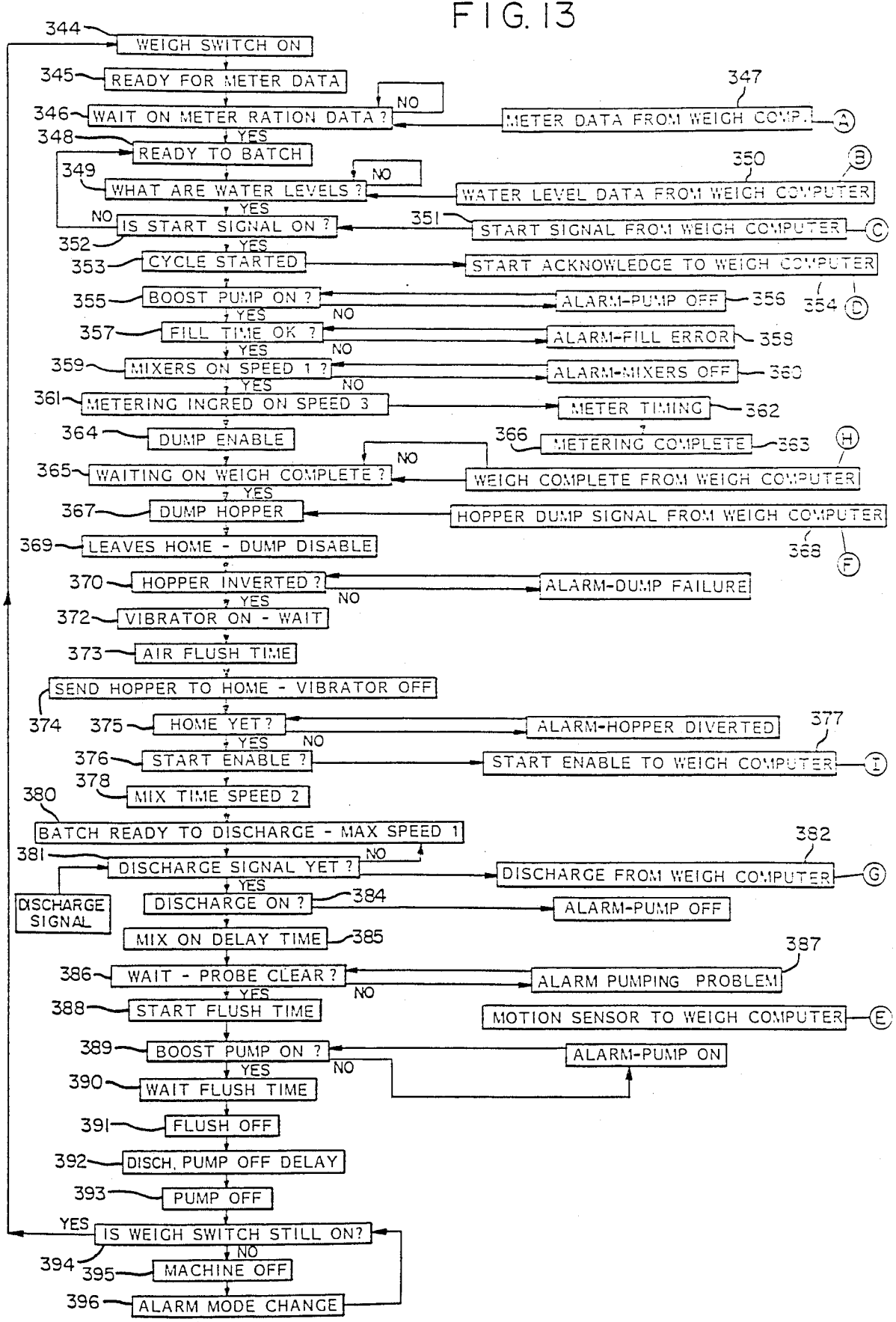
FIG. 13 is a flow diagram illustrating the logic of a computer program which controls all machine operating sequences and functions other than the weigh functions illustrated in FIG. 12.

The program next calculates metering ration data at 294 and sends it to the machine operating program at 295 as indicated by A in FIGS. 12 and 13. The metering data is calculated for any additives that have been selected for dispensing in the metering mode during the weigh cycle. Dispensing a portion of the additives by volume is more fully set forth in connection with steps 361–363 of FIG. 13 below.

The program then sets an output for the water level at 296, the level of the water determining how much fluid carrier will be present in the slurry which is ultimately delivered to receiving station 248. Water level information is sent to the machine operating program at 297, as indicated by B in FIGS. 12 and 13. The program next waits at 298 for a start signal which the operator gives by activating start switch 299 on switch panel 28. The weighing cycle is then started at 300 by sending a start signal at 301 to the machine operating program as indicated by C in FIGS. 12 and 13. Even though the weighing cycle has started, no weighing of microingredients acutally commences until a signal is received back from the machine operating program at 302 as indicated by D in FIGS. 12 and 13 that indicates weighing should begin at 304. This communication between the programs at D enables the machine operating program to begin its initial checks while microingredients are being dispensed and weighed.

Once the signal to begin weighing is received at 304, the weighing sequence begins at 306. It is first determined at 308 whether a motion sensor is detecting movement of hopper means 122. Information is received from the motion sensor on the hopper at 309, as indicated by E in FIGS. 12 and 13. The program will not progress beyond 308 until the motion sensor indicates that hopper means 122 is not moving, since movement of the hopper means will adversely affect weight determinations of load cell 264. Hopper means 122 can be put in motion by a variety of influences, such as wind gusts, floor vibration, personnel contact, or movement of machine parts. Although the effect of these movements on load cell 264 may not be great, the extreme accuracy required in dispensing microingredient feed additive concentrates makes absence of movement desirable.

It is next determined at 310 whether the scale reading is less than 1000 grams. If the reading is greater than 1000 grams, it is probably because the hopper means is not empty, as indicated at 311, and a signal is sent at 312, 313 to dump hopper means 122 so that weighing of a new lot of microingredients can begin. The signal to dump is sent to the machine operating program as indicated at step 314 and F in FIGS. 12 and 13. The mixers 182 are also started at 315 as indicated by G in FIGS. 12 and 13 so that the microingredients dumped from hopper means 122 will be mixed into a slurry and discharged to receiving station 248 in accordance with normal operation of the machine operating program described in connection with FIG. 13 below.

If the scale reading is less than 1000 grams, it is determined at 316 if the scale reads below zero. If that is the case, a message is given to the operator by 317 on screen 26 that the scale has failed and the supervisor should be called. Then at 318 the program prompts the operator to switch to a backup metering mode system which dispenses additive concentrates by volume instead of by weight, and a prompt is sent at 319 to screen 26 directing that the weigh switch 321 at panel 28 be turned off. The operator then performs as outlined in FIG. 15 by turning the meter switch on at step 500 and entering ration data at 502. Volumetric metering of additive concentrates is performed by activating motor 102 of each bin 68-74 to rotate screw 90 for a predetermined period of time. Since screw 90 will dispense an approximate known amount of concentrate per unit of time, a volumetric approximation of the desired amount of concentrate can be dispensed without weighing If the scale reads above zero at 316, the weighing mode of the program is instead used. Ingredient flow is started at 320 by activating motor 102 for screw 90 below bin 68. Motor 102 has at least two speeds so that it initially operates at a higher speed during the initial phase of dispensing additive concentrates from bin 68 into a first compartment 113 of hopper means 122. The weight of concentrate introduced into compartment 113 is sensed by load cell 264 and that information is continually fed back to the computer through line 265. As the weight of concentrate dispensed from bin 68 approaches the predetermined amount of that concentrate for the batch formulation chosen at 282, motor 122 is switched to a lower speed at 322 and 324 that more slowly dispenses the concentrate from bin 68 during a final phase of dispensing. In this manner, a more accurate weight of microingredient can be dispensed from bin 68 into compartment 113 since the dispensing of additive will have slowed before it is finally stopped when the correct weight of this first concentrate is sensed at 326.

The program contains a weight compensation step at 328. It sometimes happens that the actual weight of additive concentrate dispensed by dispensing means 80 into compartment 113 will be slightly greater or less than the desired weight set by the ration data at 282. The program compensates for such inaccuracies by adding or subtracting a weight compensation factor to the ration amount set for the additive concentrate at 282. In this manner, the weight inaccuracy will be corrected the next time a microingredient additive is dispensed from bin 68 into compartment 113.

When the predetermined weight of microingredient additive concentrate is sensed at 326 and the weighing of that component has been completed, the computer determines if the just dispensed concentrate was the last microingredient dispensed at 330. Assuming the microingredient concentrate in bin 68 was not the only concentrate to be dispensed in this formulation, the program then returns to box 320, and the flow of ingredients from bin 70 is initiated by activating motor 102 beneath bin 70 to turn screw 90 at a fast speed and begin moving microingredient additive from bin 70 into compartment 114 of hopper means 122. Load cell 264 continues to sense the weight of concentrate added to hopper means 122 from bin 70 until that weight begins to approach the final predetermined weight desired of the second concentrate. This predetermined weight will be the total actual net weights of the first additive concentrate plus the predetermined weight of the second additive concentrate since hopper means 122 has not yet inverted and the first additive concentrate still remains in compartment 113 As the total combined actual weight of additive concentrate in compartments 113, 114 approaches the predetermined amount, motor 102 is switched to a slower speed, and additive concentrate is continued to be slowly dispensed with screw 90 from bin 70 until the total combined weight of additive concentrate is reached, and motor 120 is shut off.

This same procedure is repeated until the predetermined weight of additive from each of bins 72, 74 is similarly dispensed into compartments 115, 116. Liquid microingredient additive concentrates from containers 76 and 78 are dispensed by activation of a liquid pump which sequentially dispenses liquid additive from containers 76, 78 into liquid receiving compartments 117, 118 of hopper means 122 until a predetermined amount of each liquid additive has been dispensed.

Once the last additive has been dispensed, as determined at 330, the computer determines that weighing has been completed at 332, which sends at 334 a signal to the machine sequence program as indicated by H in FIGS. 12 and 13. The computer pauses at 336 to wait on discharge of hopper means 122. Once dumping of hopper means 122 has been completed by inversion of the hopper and its return to an upright position, this information is sent from the machine operating program of FIG. 13 to the weighing program of FIG. 12 as shown at I and 338. It is then determined at 340 whether another batch of microingredient is required. If not, the program returns from 342 to its starting point at 280. If another batch is required, the program returns to box 292 and the sequence repeats itself as described above.

Although not shown in FIG. 12, the weigh program can be modified to keep a running inventory of additive concentrates. This can be accomplished by entering into the weigh computer the weight of additive concentrate placed in each of bins 68-74 and containers 76, 78. The weight of each concentrate actually dispensed and sensed by load cells 264 is then subtracted from the original weight of concentrate to determine the inventory of concentrate remaining.

The control means can also be programmed to perform other functions that enhance the accuracy of weight determinations by the weighing means. For example, the isolating means can include programming the control means to prevent acceptance of the measured weight by the control means following operation of dispensing means 80 until motion of hopper means 122 sensed by motion sensors has subsided to a level that will not affect load cells 264. The same result can be achieved by programming the control means to delay operation of all other movable machine components (such as dispensing means 80, 120 or mixers 182) for a predetermined period of time sufficient for hopper 122 to settle or until any oscillatory movements subside. Alternatively, the isolating means can include programming the control means to prevent operation of moving components (such as dispensing means 80, 120 or mixers 182) while weight determinations are being made by the load cells 264.

Machine Sequence Program

FIG. 13 schematically illustrates the logic of a program for actuating the sequence of operations of apparatus 10. The program begins by determining at 344 if the weigh switch on switch panel 28 has been turned on. Once the weigh switch is on, the program is ready for a metering data signal at 345. It waits at 346 until the metering ration data is received at 346 from steps 347 and 295 as indicated by A.

Once the metering data is received, the program is ready to batch at 348. It receives water level data at 349 from 350 and 297 as indicated by B. The start signal from 301 is then relayed via C to 351 and 352. The machine cycle is then started at 353, and initiation of the cycle is signaled to the weighing program from 354 through D to 302.

Boost pump 193 is then turned on at 355 for introducing water through line 194 in FIG. 10 with solenoid 206 open and solenoid 212 closed. It is determined at step 355 if the boost pump is on, and if it is not, an alarm is sounded at 356 that the pump is switched off. Boost pump 193 introduces water through line 208, conduit 210, and port 177 until a predetermined water level set at 294 is sensed by level probe 192. If the predetermined water level is not reached within a set period of time as indicated by 357, an alarm sounds at 358 to indicate that an error has occurred. Otherwise, if mixing vessel 170 fills within the set time, this condition is detected by level probe 192 and mixing blade motors 188 are activated at 359 on a slow speed to cause the water in mixing vessel 170 to flow. If the motors 188 do not turn on, an alarm is given at 360 to alert the operator of this malfunction.

It is possible to accurately dispense some liquid microingredient additives such as those in containers 74, 76 by volumetric metering instead of weighing. Such accurate volumetric metering is possible since the density of most liquids is quite constant over the range of environmental conditions in which apparatus 10 is used. Volumetric metering of liquid additives selected by the metering ration data is achieved at 361 by activating the piston pump in dispensing means 120 for a period of time determined by 362, 363. Once the metering step is completed, the dumping mechanism is enabled at 364 for proceeding to weigh complete step 365 before inverting hopper 122.

The program waits at step 365 for the weighing sequence shown in FIG. 12 step 320 through step 334 to be complete. Once the weighing sequence is completed at step 334, a signal is sent to 365 through 366 at H from the weigh program, and the sequence program progresses to 367 where a signal is given at 368 from 314 via F to actuate motor 138 and invert hopper means 122 to dispense the additive concentrates contained in compartments 113–118 separately but simultaneously into the flowing water of vessel 170. The dumping mechanism is disabled at 369 once the hopper leaves its upright position. Once hopper means 122 is inverted at 370, vibrators on the hopper are activated at step 372 to promote complete removal of all microingredient particles from bins 113–118. Compressor 142 is next actuated at 373 to compress air in air tank 146, and a solenoid to header 150 is opened which moves a flow of air through hoses 152 and toward wall 154 of each of compartments 113–116 to remove any traces of solid additive concentrates from the compartments. Air flushing continues for a predetermined period of time at step 373.

Hopper means 122 is then sent to its home position at step 374 by activating hopper motor 138 to continue to turn shaft 136 in the same direction it turned to invert the hopper. When the hopper returns to its upright position, this is sensed by a switch as indicated by step 375, and a signal is sent at 376, 377 to 338 through I that the contents of hopper means 122 have been dumped, and another weigh cycle (FIG. 12) can begin. Meanwhile the machine operating program of FIG. 13 progresses to step 378 which switches motors 188 of mixers 180 to a higher speed. The lower motor speed is used until hopper means 122 leaves its inverted position since high speed mixing while the hopper is inverted could cause water drops to be splashed into containers 113–116. Step 378 also begins to measure a predetermined mixing time. When the period for the preselected mixing time expires, as determined at 380, the mixing motors 188 are switched back to their lower speed. Once the weighing program receives a discharge signal at 381 from step 315 through G and 382, or alternatively from actuation of a discharge switch 383 on switch panel 28, a discharge signal is sent by the program at 384 to discharge the slurry in vessel 170. A solenoid valve in line 240 then opens, and pump 244 (FIG. 10) is activated to remove the slurry through outlet 178 in vessel 170. Mixer blades 182 continue turning at a slow speed until a predetermined period of time expires, as set by step 385. Pump 244 continues operating as the water level lowers and finally clears the bottom of probe 192, as illustrated by step 386. If the level probe is not cleared within a predetermined period of time, an alarm is given at 387 to indicate a pumping malfunction.

After the water level clears the bottom of probe 192, pump 244 continues operating and a timed flush cycle begins at 388. Boost pump 193 is activated at 389 for introducing water through line 194 as solenoid 206 is closed and solenoid 212 is opened. In this manner, flush water is introduced through line 214 so that it enters vessel 170 through nozzles 228 of flush ring 226, blade flush nozzles 224, and port 177. The interior of vessel 170 and the surfaces of blades 182 are thereby flushed, completely removing any residue of microingredient additives from the vessel through inlet 179. The boost pump continues introducing a water flush into vessel 170 until the flush time period expires at 390, and the flush is terminated at 391. Discharge pump 244 continues pumping for a delay period following the end of the flush cycle, as shown at 392; then discharge pump 244 is turned off at 393.

The program then determines if the weigh switch is still on at 394 and if it is, the program returns to step 344 to repeat the sequence described in steps 344–393. If the weigh switch has been turned off, the apparatus 10 is turned off at 395 and an alarm is given at 396 to indicate that a mode change has been made.

The control means includes means for operating mixers 180 and discharge pump 244 at the same time as dispensing means 80 such that a first batch of additive concentrate slurry can be mixed and delivered to a receiving station while a second batch of additive concentrates are dispensed and weighed prior to their deposit into the mixing vessel.

Electrical Schematic

A schematic diagram of the electrical connections for apparatus 10 is shown in FIG. 14.

It is important to the proper operation of a computer that it be supplied with electrical power of a constant and consistent quality. This is a serious drawback in rural areas where the electrical power being supplied is often at the end of a long supply line into which fluctuations are introduced by intervening power users. Most cattle yards and other users of apparatus 10 are located in rural areas where variations in power would adversely affect operation of the computers which control weighing and sequencing of machine function. For that reason, the present invention employs a series of transformers to selectively filter the electrical energy, isolate the power source, and damp variations in the power before it is supplied to the computers.

Four hundred eighty volts of power are supplied at 400 by a rural electrical utility, and that power first passes through 10 kw isolation transformer 402 where it is transformed into 240 V power, illustrated by 404 in FIG. 14. This initially filtered 240 V power is supplied to electrical connection line 405 through relay 406 to booster pump 193 that introduces water into mixing tank 170 during the filling and flushing cycles. The 240 V power is also supplied through relay 407 to pump 244 that helps drain the mixing tank. This relatively unfiltered power can be supplied to pumps 193, 244 since they are not as sensitive to power variations as the computers.

The 240 V power is also sent to a sola-regulating transformer 408 where it is transformed to 120 V power, as illustrated at 409. This filtered, 120 V power is used to provide electrical energy to all components of apparatus 10 other than pumps 195, 244. If electrical energy is interrupted, three 12 V batteries 410 connected in series are provided as an uninterruptable power supply through triple power supply 412.

Remote control unit 20 has monitor screens 26, 29 and keyboards 24, 27 for weighing and metering functions. Remote control unit 20 is electrically connected through line 422 with a weigh microcomputer 424 (RA 1800 Micro System Z80 Microprocessor) having a 120 V optically isolated input/output relay board 426. Remote control unit 20 is also connected through line 428 with machine sequencing microcomputer 430 (RCA 1800 Micro System Z80 Microprocessor) having an optically isolated input/output relay board 432 (Opto PB 24Q). Computer interface 434 provides a data bus between weigh microcomputer 24 and machine sequencing computer 430.

Machine sequencing computer 430 and weigh computer 434 are supplied with 5 V power from triple power supply 412 through line 411. Both I/O boards 426, 432 are supplied with 120 V power through line 436 at Weigh computer 424 contains an eight slot card cage with three 662 RAM memory cards that contain the programs for operation of the weighing functions and monitoring of microingredient additive inventory. Weigh computer 424 also contains a service box 641 card to connect the service box to the computer, a printer 641 output card, a 600 system operating program card, and a 6264 memory card.

The machine computer 430 has a six slot card cage, including two 662 RAM memory cards, as well as a 659, 650, 641 and 600 CPU card. When apparatus 10 is functioning in the metering mode, it uses only machine computer 430. A complete set of ration data is stored on the machine computer's ROM memory separate from the ration data stored on the RAM memory cards of weigh computer 424.

I/O board 426 is connected through line 448 with a speed control 444 for controlling the speed of dispensing means 80 in the weigh mode during a weigh cycle. For additives dispensed in weigh mode, speed control 444 determines whether screw 90 rotates at a fast speed during the initial weighing period of a given concentrate, or at a slow speed during the terminal phase of weighing as the weight of the concentrate approaches its predetermined amount. Since it is necessary to sense the weight of each concentrate that has been dispensed before the speed of dispensing means 80 can be reduced and then stopped, load cells 264 are electronically connected through scale head 418 to the weigh microcomputer 424. Weight determinations of the weighing means can therefore be sensed and sent to speed control 444. For additives dispensed by volume during a weigh cycle, speed control 444 determines that screw 90 rotates at the preset third speed during the predetermined time of volumetric dispensing controlled by micro computer 430.

I/O board 432 is connected through line 446 with speed control 444 for controlling the speed of dispensing means 80. Speed control 444 determines that screw 90 rotates at the preset metering speed on the third speed of speed control 444 for a predetermined amount of time of volumetric dispensing controlled by microcomputer 430.

Input/output board 432 is connected through line 440 with ingredient level controls 442 in each of bins 68-74 and containers 76, 78. These level controls are conventional switches located within the bins and containers for sensing when the level of additive concentrate in each bin has reached a predetermined low level. When the low level of additive concentrate is sensed by low level control 42, a signal is sent to the operator indicating that more concentrate should be added.

I/O board 432 of machine sequencing microcomputer 430 is connected through line 450 and relay 452 with hopper rotation motor 138 that inverts hopper means 122. Line 456 connects I/O board 432 through relay 458 with vibrator 141 on hopper means 122. A switch 462 is also provided on hopper means 122 for sensing whether the hopper is in an upright or inverted position, switch 462 being connected to I/O board 432 through line 464. Finally, hopper means 122 is provided with hopper air flush solenoid valve 466 in header 150 for controlling the introduction of air flush into compartments 113-116 of the hopper after it reaches its inverted position. Solenoid valve 466 is connected to I/O board 432 through line 468.

Mixer motors 188 on mixing vessel 170 are connected through relay 470 and line 472 with I/O board 432. Level control 192 of the mixing vessel is connected with I/O board 432 through line 474. Solenoid valve 212 in flush line 202 is connected to I/O board 432 through line 476, and solenoid 206 in fill line 204 is connected to I/O board 432 through line 478. Booster pump 195 for pumping water into vessel 170 is connected through relay 406 and line 480 with I/O board 432, while pump 244 for withdrawing slurry and flush water from vessel 170 is connected through relay 407 and line 482 with I/O board 432. Low water control 484 for the water supply is connected through line 485 with the I/O board. Motion and panel control sensors 486, which detect any oscillatory movements of hopper means 122 and determine if any of the panels 12 have been removed from apparatus 10, are interconnected with I/O board 432 through line 490.

Metering Mode Program

As earlier described in connection with FIG. 12, in the event of scale failure at step 317, apparatus 10 switches to a meter mode at 318 and the weigh switch is turned off at 319. The off position of the weigh switch at 319 is sensed as the meter switch being on at step 500 in FIG. 15. The numeral 1 is entered at keyboard 24 at step 502 to begin batching in the metering mode, and a ration code name is entered at 504. The metering mode program of FIG. 15 searches at 506 for a ration corresponding to the code entered at 504. If the corresponding ration is not found at 506, the program returns at 508 to step 504 so that another ration name can be entered.

Once the entered code has been matched with a ration at 506, the program prompts for entry of information concerning batch size, which is entered at 509. The program next prompts for entry of information concerning the number of batches to be processed, which is entered at 510. The machine is then ready to batch at 512 by volumetric metering instead of by weighing.

The program waits at step 514 for a start signal 516, which is supplied by a start switch 299 on control panel 28. It is then determined at 518 if boost pump 193 is on, and if it is not, an alarm is given at 520 to indicate that the pump is off. Boost pump 193 fills mixing vessel 170 during a predetermined amount of time at step 522. If the water level in mixing vessel 170, as detected by water level sensor 192, does not reach a predetermined level within a set period of time, an alarm sounds at 524 to indicate a filling error.

Once level sensor 192 determines that the water level in mixing vessel 170 has reached a predetermined level, mixing motors 188 are activated at 526 to rotate mixing blades 182 at a slow speed. An alarm sounds at step 528 if the mixers are not on. While mixer blades 182 induce a turbulent flow of water in mixing vessel 170, motor 102 for screw 90 below bin 68 is activated at 530. The metering speed of motor 102 is a third speed, intermediate the fast and slow speeds used in dispensing additive concentrates by weight. Screw 90 turns for a predetermined period of time sufficient to dispense a required volume of additive concentrate. The screw of each dispensing means 80 below the bins containing desired additive concentrates turn simultaneously. Dispensing means 120 for liquid additive concentrates in containers 76, 78 also operate simultaneously with dispensing means 80 to volumetrically deliver predetermined amounts of liquid concentrate to compartments 117, 118.

When metering is complete at 532, a signal is sent to motor 138 at step 534 to invert hopper means 122 and dump its contents into the flowing water of vessel 170. A switch determines at 536 whether the hopper is inverted, and if it is not, an alarm is given at 538 to indicate a dump failure. Hopper vibrators are then actuated at 540 while hopper means 122 is inverted to remove, by vibration, additive concentrate particles that remain stuck to the walls or bottom of containers 113-116. The air flush (FIG. 11) is actuated at 542, and the program sends a signal at 544 to send the hopper to its home, upright position by actuating motor 138 to continue rotation of shaft 136. If hopper means 122 does not reach its home, upright position within a predetermined period of time set by 546, an alarm sounds at 548 to indicate that a malfunction has occurred and the hopper is still inverted.

When hopper means 122 leaves its inverted position, mixing motors 188 are switched to their second, higher speed at 548. High speed mixing continues for a predetermined amount of time and then returns to low speed at step 550 until a discharge signal 554 is received at 552 from a discharge switch 383 on panel 28 to turn on discharge pump 244. It is determined at 556 whether discharge pump 244 is on, and if it is not, an alarm is given at 558 to indicate a pump malfunction.

A predetermined, mix delay time period is initiated at 558 during which period motors 188 continue to move mixing blades 182 at low speed. If the bottom of level probe 192 is not cleared at 560 within the predetermined period of time set in step 558, an alarm is given at 562 to indicate pumping problems. Once probe 192 has been cleared, a predetermined flush cycle time is initiated at 564, and boost pump 193 is actuated at 566 to move water through flush line 214 while solenoid 212 is open and solenoid 206 is closed. Boost pump 193 continues introducing water through line 214 and into flush ring 226, blade cleaning nozzles 224, and port 177 until a flush period has expired at 568 and pump 193 is turned off at 570. Discharge pump 244 continues operating for a period of time set by 572 until all of the flush water residue has been removed through drain 178 and sent to receiving station 248. Discharge pump 244 is then turned off at 574 when the delay period set at step 572 expires.

The metering mode program then determines whether another batch is needed at 576, the need for another batch having been determined by the number of batches entered at 310. If another batch is not needed, the program returns to step 502 which prompts the operator to enter the code for another batch. If, on the other hand, another batch is required at 576, the program checks at 578 to determine if the meter switch is still on. If the metering switch is on (and conversely the weigh switch is off), the program returns to step 512 where it repeats steps 512-576. If it is determined at 578 that the meter switch is off, apparatus 10 is turned off at 580 and an alarm is given at 582 indicating a mode change.

FIG. 16 Embodiment

Figure 16:
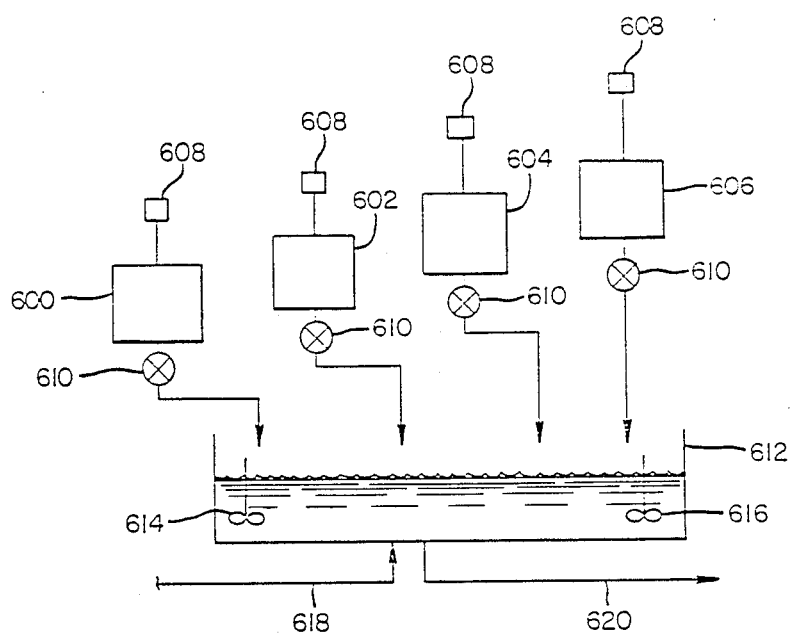
FIG. 16 is a schematic view illustrating a first alternative embodiment of the invention in which microingredient additive concentrates are dispensed directly into a mixing vessel from individually weighed storage containers.

FIG. 16 shows a second embodiment of apparatus 10 in which hopper means 122 has been eliminated. In this embodiment, the weight of each microingredient concentrate dispensed is determined on a "loss of weight" basis. Each of dry concentrate bins 600, 602, 604, 606 is provided with a load cell 608 for determining the weight of each container. The program in this embodiment activates a dispensing means 610 (similar to dispensing means 80 in apparatus 10) to selectively sequentially or simultaneously deliver dry microingredients separately from bins 600-606 into mixing vessel 612 having mixers 614, 616. Tank 612 is filled and flushed through water supply line 618 and emptied through discharge line 620 after concentrates have been mixed with water in mixing vessel 612.

Liquid microingredient concentrates may also be dispensed on a "loss of weight" basis by mounting containers of liquid microingredient on load cells.

The control means for the FIG. 16 embodiment includes a means for controlling the dispensing rate of each dispensing means 610 in response to loss of weight sensings of load cell 608 for each bin 600-606. Such a control means is similar to speed control 444 for dispensing means 80 in FIG. 14.

In a variation of the embodiment of FIG. 16, the control means includes a means for operating dispensing means 510 for several cycles in the volumetric metering mode wherein additives are dispensed using a weight per unit time formula instead of load cell 608. The actual weight of each additive concentrate dispensed will be determined by the loss of weight measured by each load cell 608. The actual weight of concentrate lost will be compared by the computer to the theoretical amount dispensed. The discrepancy between the actual and theoretical amounts will then be corrected by adjusting the formula to dispense more accurately the desired amount of additive concentrate. Since the remaining concentrate in each bin has substantially the same density as that already dispensed, the remaining additive can be dispensed accurately by volume.

Correction of the weight per unit time formula used for volumetric dispensing in the metering mode can be used in connection with any embodiment employing a weighing means. For example, volumetric metering into hopper means 122 of FIG. 2 can be adjusted by comparing actual weights of additive concentrate dispensed into compartments 113-116 with the desired amounts determined on a weight per unit time formula. The computer can then correct the formula to account for the density and other properties of the particular batch of additive concentrate being dispensed.

Alternatively, dispensing means 80 can be operated in a weigh mode from the beginning through a major portion of a dispensing cycle for a particular additive concentrate. The load cell 264 monitors the weight of concentrate dispensed at a given speed of screw 90. This information is used by the control means to prepare a weight per unit time formula for volumetric dispensing of the particular additive being dispensed. The dispensing means 80 is then operated in a volumetric metering mode independently of the weighing means for the final portion of the dispensing cycle.

FIG. 17 Embodiment

Figure 17:
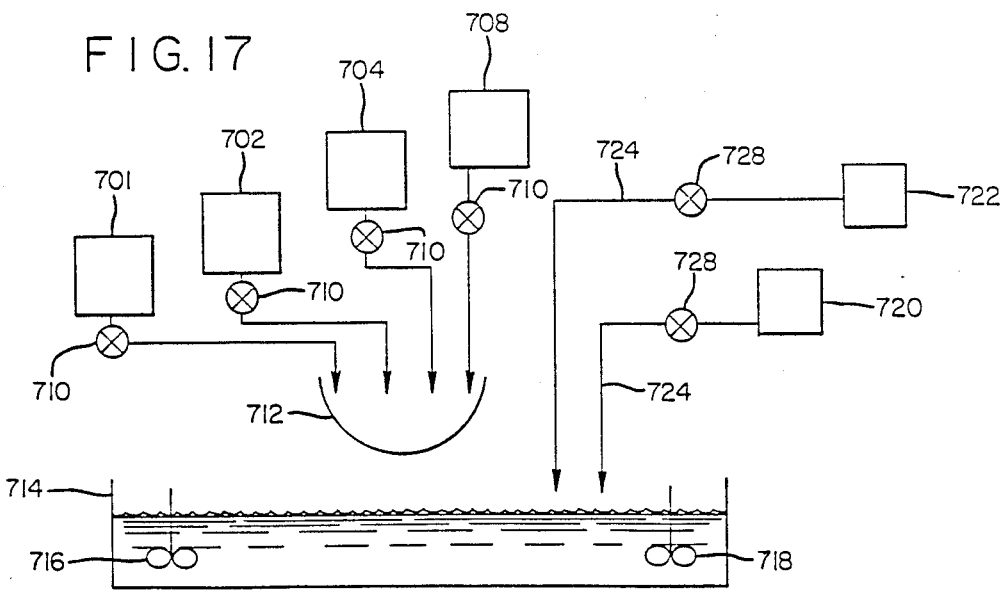
FIG. 17 is a schematic view illustrating a second alternative embodiment of the invention in which dry additive concentrates are dispensed by weight into a weigh hopper while liquid additive concentrates are metered by volume directly into the mixing vessel.

Yet another embodiment of the invention is shown in FIG. 17 which takes advantage of the fact that the density of liquid microingredient concentrates does not vary as greatly as solid microingredients. For this reason, it is possible to accurately meter liquid microingredients by volume while measuring the solid microingredients by weight. In the embodiment of FIG. 17, four dry microingredient containing supply means 701, 702, 704, 708 are shown to each be connected to a dispensing means 710 similar to the dispensing means 80 of apparatus 10. Each of dispensing means 710 conveys dry additive concentrate to a hopper means 712 similar to hopper means 122 in FIG. 5, the hopper means 712 being suspended from a pair of weigh cells. Each additive concentrate is dispensed sequentially into hopper means 712 from containers 701, 702, 704, 708 using dispensing means 710 until a predetermined weight of each concentrate has been sensed by a load cell from which hopper means 712 is suspended. Hopper means 712 is then inverted to separately and simultaneously empty the dry microingredient contents of hopper means 712 into flowing water in mixing vessel 714 which is being agitated by mixers 716, 718.

In the FIG. 17 embodiment, liquid microingredients are separately stored in containers 720, 722 which are provided with tubes 724 that empty into vessel 714. Rotary or piston pumps 728 are interposed in each tube 724 to pump microingredients from containers 720, 722 directly into mixing vessel 714, thereby bypassing entirely hopper means 712.

The control means for the FIG. 17 embodiment may, in some embodiments, include means for selectively operating some dispensing means simultaneously and others sequentially. Pumps 728 for the liquid additive concentrates in containers 720, 722 may, for example, be operated simultaneously with each other and with dispensing means 710. Dispensing means 710 for dry additives should, however, be operated sequentially in this embodiment since the overall weight of hopper means 712 is sensed by the load cells from which the hopper is suspended. If the dry additives were dispensed simultaneously into hopper means 712, it would not be possible to weigh accurately the amount of each additive dispensed. It is through cumulative weight determinations of sequentially dispensed additives that accurate weight determinations are made in the compartmented hopper. A first additive concentrate is delivered into a compartment of the hopper until its load cells register a first predetermined weight, and delivery of the first additive concentrate is stopped. Delivery of a second additive concentrate is then started and continued until the load cells register a second predetermined weight, and so on until predetermined weights of all selected additives have been delivered into the hopper.

In yet other embodiments which are not shown in the drawings, the control means is programmed to operate the dispensing means in an interrupted, on-off-on-off sequence to dispense selected microingredients into a weighing means such as hopper 122. Weight determinations sensed by load cells 264 would only be accepted when the dispensing means is switched off during the interrupted sequence. In this manner, weighing inaccuracies caused by movement of the dispensing means or settling of additives would not affect weight determinations.

In another disclosed embodiment, the isolating means includes programming the control means to prevent operation of any other moving components of apparatus 10 while weight determinations are being made by the weighing means. The operation of dispensing means 80 and mixer blades 182 would, for example, be prevented by the control means while weight determinations were being made by load cell 264.

FIG. 18 Embodiment

Figure 18:
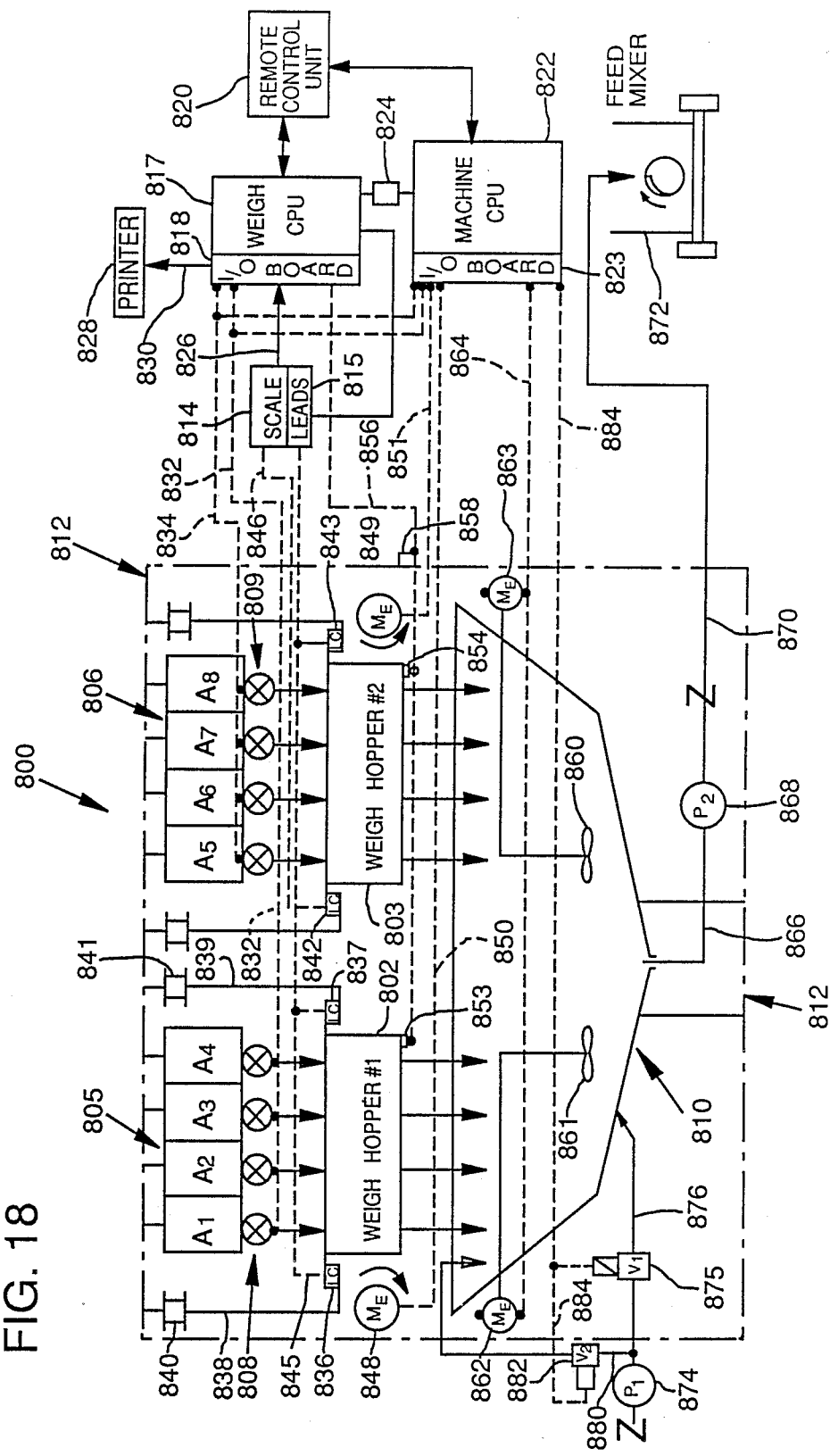
FIG. 18 is a schematic view showing a third alternative embodiment of the invention in which different additive concentrates can be dispensed into different weigh hoppers simultaneously and the different weigh hoppers discharged either independently or simultaneously and either after the weighing of each additive or cumulatively after the cumulative weighing of multiple additives in each hopper.

FIG. 18 shows an apparatus indicated generally at 800 in accordance with the invention and somewhat similar to the embodiment of FIGS. 1-15 but having two separate weigh hoppers 802, 803 for weighing the multiple additive concentrates dispensed from additive concentrate storage means 805, 806 by dispenser means 808. The weigh means of the apparatus 800 includes separate weigh means for each weigh hopper 802, 803, thereby giving the apparatus the capability of weighing multiple additives simultaneously in different weigh hoppers. This capability gives the apparatus 800 an advantage over the apparatus of FIG. 1 in being able to dispense, weigh and discharge all of the multiple microingredients of a given formulation into the mixing vessel 810 and thereby complete the batching of a formulation, more quickly than the apparatus of FIG. 1.

The apparatus 800 also includes a support frame means 812 which may include either separate support and weigh frames as in the apparatus of FIG. 1 or a common support frame for all of the major mechanical components of the apparatus as depicted schematically in FIG. 18. Support frame 812 rigidly supports the multiple microingredient concentrate storage containers 805, 806 and their associated dispensers or metering devices 808, 809. The support frame means 812 also rigidly supports the mixing vessel 810 which is shown as a mixing vessel common to both weigh hopper 802 and weigh hopper 803.

Other major components of the system of FIG. 18 include control and other components which would normally be mounted apart from support frame means 812, including a pair of scale heads 814, 815, one for each weigh hopper, a weigh computer or central processing unit 817 with its associated input/output board 818, and a remote control unit or terminal 820 for controlling the operation of the computer 817. A separate machine computer or central processing unit 822 has an associated input/out board 823. An interface 824 enables communication between the machine computer 822 and the weigh computer 817. Scale heads 814, 815 transmit weight determination data through line 826 to the input/output board of the weigh computer 817. There is also a printer 828 connected to the input/output board of weigh computer 817 through line 830 for printing desired output data from the weigh computer 817.

In the apparatus 800 there are four microingredient additive concentrate storage containers 805 associated with weigh hopper 802 and another four such storage containers 806 associated with the other weigh hopper 803, thereby giving each weigh hopper the capability of weighing and discharging four different additives into the mixing vessel 810. The dispensers 808 associated with the different additive storage containers 805 are capable of operating independently of one another upon an appropriate command signal from a weigh computer 817 transmitted from the input/output board 818 through line 832. Similarly, each of the dispensers 809 for the four other storage containers 806 are capable of operating independently of one another to dispense additives into the weigh hopper 803 upon a suitable command signal from weigh hopper 817 transmitted from input/output board 818 through line 834.

Weigh hopper 802 is mounted at its opposite ends on a pair of load cells 836, 837 connected by suspension members 838, 839 and a pair of resilient isolator members 840, 841 to support frame 812.

Weigh hopper 803 is mounted in a similar manner by load cells 842, 843 to support frame 812. Thus, each weigh hopper is independently mounted by separate weigh means to the frame 812 for independent weighing of ingredients. The two load cells 836, 837 for weigh hopper 802 are operatively connected by a line 845 to scale head 815. Weigh hopper 803 is separately connected by a line 846 to a separate scale head 814. Both of the scale heads in turn are connected to the input/output board 818 of weigh computer 817 through line 826. Thus each weigh hopper and its contents can be weighed separately and its contents cumulatively through its associated scale head simultaneously with the other weigh hopper. That is, both weigh hoppers can carry out their weighing functions at the same time and independently of one another.

Each weigh hopper 802, 803 is preferably similar in construction to the weigh hopper disclosed in FIGS. 2, 3, 5, 6 and 7. That is, each weigh hopper is mounted in a manner shown in such prior figures for rotation from its normal additive receiving upright position to an inverted discharge position by discharge means including an electric motor 848 in the case of weigh hopper 802 and electric motor 849 in the case of weigh hopper 803. Each is connected independently to the input/output board 823 of the machine computer 822 through suitable electrical conductors 850 and 851, respectively.

Each weigh hopper, 802, 803 also is provided with a motion sensor 853, 854, respectively, connected to the input output board 818 of weigh computer 817 through line 856 for detecting any motion in either weigh hopper during the weighing process. The software for the weigh computer 817 prevents a final weight determination from being made for a given weigh hopper whenever the motion sensor for that hopper senses motion that might give a false or highly inaccurate reading.

The support frame means 812 for the weighing and delivery components of the apparatus is preferably enclosed by housing panels (not shown) in a manner similar to that shown in FIG. 1 to shield and isolate the weighing components of the apparatus from external ambient forces that could cause undesirable motion and thus inaccurate weight readings. Such forces typically might include the effects of wind or jarring of the components by direct contact of personnel. The support frame means 812 is provided with a sensor 858 which is also connected by line 856 to the input/output board of weigh computer 817. Sensor 858 is operable to prevent a weight determination from being made whenever a panel is removed from the support frame 812. Thus the motion sensors 853, 854 for the weigh hoppers and the panel sensor 858 for support frame 812 provide additional means for isolating the weighing components of the apparatus from influences that could affect weight determinations and the accuracies of such determinations.

A further means of enhancing the accuracy of the weight determinations of the apparatus disclosed in FIG. 18 is the mounting of the discharge motors 848 and 849 in conjunction with their respective weigh hoppers 802, 803 so that such motors become part of the tare weight of the hoppers in making additive weight determinations. Because very lightweight, flexible electrical conductors can connect such electric motors to the operable control components of the apparatus, such conductors will have no appreciable effect on the weight determinations of the weigh means. This should be contrasted with the hydraulically actuated discharge means in conjunction with the weigh hoppers of prior apparatus. With a prior hydraulically actuated discharge means, relatively stiff hydraulic conduit must connect the hydraulic motor associated with the hopper to the source of hydraulic fluid remote from the hopper. Typically such hydraulic conduit affects weight determinations of the hopper in such instances because it inherently provides some structural support for the hopper, thereby influencing load cell weight sensings as ingredients are added to the hopper because the conduit is partially supporting some of the load of the added weight.

The apparatus in FIG. 18 also includes positive mixing means within the mixing vessel 810 in the form of a pair of mixing blades 860, 861, each driven by an electric motor 862, 863. The mixer motors are connected by electrical conductor means 864 to the input/output board 823 of the machine computer 822. A slurry discharge line 866 leads from a bottom opening of mixing vessel 810 to the input side of a discharge pump 868.

The discharge line continues at 870 from the discharge side of discharge pump 868 to a conventional feed mixer such as typically the truck-mounted feed mixer 872. A booster pump 874 pumps a liquid carrier such as water from a source (not shown) through a fill line 876 into the mixing vessel. A solenoid operated valve 878 in fill line 876 controls the admission of the water carrier into the mixing vessel and is operated by the machine computer 822 through a suitable conductor 878 connected to the input/output board 823 of such computer.

A flush line 880 branches from fill line 876 downstream of booster pump 874 and upstream of fill valve 874. Another solenoid actuated valve 882 in the flush line connected to the input/output board 823 of machine computer 822 through conductor 884, controls the admission of flush fluid into the mixing vessel.

The hardware components of the control system including the weigh computer 817, machine computer 823 and their associated input/output boards, the printer 828, and the remote control unit 820, may be similar to those same units described with respect to the embodiment of FIG. 1. Similarly, the software controlling the operation of such computers can be varied to vary the operating sequence of the machine of FIG. 18.

A typical operating sequence of the machine of the apparatus of FIG. 18 is as follows:

A driver drives a feedtruck into a feed-receiving station in a cattle feedlot. The driver departs his vehicle, approaches the remote control unit 820 and selects the formulation of feed additive concentrates to be batched and delivered into his truck, depending on the specific lot of animals to be fed within the feedlot. The formulation is selected typically by the operator depressing a key corresponding to the formulation selected on the computer terminal of the remote control unit.

Assuming that predetermined weights of two additives A1, A2 in storage containers 805 and two additives A5, A6 from storage containers 806 are to be included in the formulation, the dispenser 808 for container A1 begins to dispense the additive A1 into weigh hopper 802. At the same time, the dispenser 809 for container A5 begins to dispense additive A5 into weigh hopper 803. The dispensing of additive A1 into weigh hopper 802 continues until a predetermined weight of such additive has been added to such hopper as determined by the load cells 836, 837 and the associated scale head 815, at which point the weigh computer 817 stops the dispensing of additive A1 from its storage container by stopping its associated dispensing means 808. At the same time, a weight determination of the additive A5 added to weigh hopper 803 is determined in the same manner, but independently of the weight determination occurring in hopper 802.

When the predetermined weight of additive A1 has been added to weigh hopper 822, depending on programming, two alternative functions can occur. Either the weigh hopper 802 can be inverted by motor 848 to discharge the additive A1 into the mixing vessel 810 and then returned to its upright position to receive the next additive A2, or the weigh hopper can remain in its upright position while the dispenser 808 for additive A2 operates to add, cumulatively, the predetermined weight of additive A2 to weigh hopper 802. If the latter sequence is used, weigh hopper 802 is inverted by its discharge motor 848 to discharge the predetermined weights of additive A1 and additive A2 together into the mixing vessel 810. The same options are available with respect to the addition of additives A5 and A6 to weigh hopper 803 and the discharge of the contents of the weigh hopper 803 into the mixing vessel 810. It is important to note that both weigh hoppers 802 and 803 can operate entirely independently to weigh and discharge their preselected additives into the mixing vessel 810, although the machine and weigh computers could also be programmed to cause both weigh hoppers 802, 803 to wait until all of the selected additives have been added and weighed within each weigh hopper and then both weigh hoppers inverted simultaneously by their respective motors to discharge all of the weighed additives at once into the mixing vessel. That is, each additive can be added, weighed and discharged either separately or cumulatively with other additives, depending on the programming selected for the control system.

Regardless of which of the above described dispensing, weighing and discharge options are selected, preferably booster pump 874 pumps the carrier water through open valve 874 and fill line 876 to fill the mixing vessel 810 to a predetermined level before any additive is discharged into the mixing vessel. This will prevent different and possibly incompatible additives from intermixing in concentrated form and also prevent additives from sticking to the inside walls of the vessel, making it difficult to remove such additives even after carrier water or flush water is added to the vessel.

Also preferably before the discharge of any additives into the mixing vessel in making up a batch, mixing blades 860, 861 rotate to create a turbulent flow within the mixing vessel so that additives entering the liquid carrier are quickly intermixed with and dispersed throughout the carrier, thereby diluting the concentrates.

When the predetermined weights of the selected additives A1, A2, A3 and A6 all have been weighed in their respective weigh hoppers 802, 803 and discharged into the water carrier within mixing vessel 810, mixing blades 860, 861 continue to rotate for a time to ensure a uniform dispersal of all additives throughout the carrier liquid slurry thus formed. Of course at this time, booster pump 874 shuts off and fill line valve 874 closes, as does flush line valve 882.

When mixing is complete within mixing vessel 810, discharge pump P2 operates to pump the slurry formulation from the mixing vessel through discharge line 866 and to the waiting feed mixer truck 872 through discharge line 870. When the level of slurry within the mixing vessel drops below a predetermined level as determined by level sensors (not shown) within the vessel, booster pump 874 restarts and flush line valve 882 opens to pump flush water into the mixing vessel through its top and along its side walls to flush all slurry residue from the vessel. Flushing continues as the discharge of slurry proceeds through the discharge lines 866, 870. Discharge pump 868 continues to operate during the complete flush period, pumping the flush liquid with the slurry into the feed mixer truck 872. After a predetermined length of time sufficient to enable the complete flushing of the mixing vessel and discharge lines, and the pumping of all slurry into the feed mixer 872, booster pump 874 stops and flush valve 882 closes. Pump 868 continues to operate until all of the slurry and most of the flush liquid is pumped into the feed mixer 872. Thereafter the truck operator returns to his truck and drives away as the mixing of the feed and slurry continues. Typically, the driver drives to the feed bunks of selected pens or lots of animals and delivers the additive-bearing feed into the bunks immediately upon departure from the additive receiving station. Thereafter, typically, another feed mixer truck arrives at the additive receiving station represented by the position of truck 872 and that operator goes through the same procedure as just described, selecting the same or a different formulation depending on the requirements of the animals within the lot or pens that are to be fed with the feed ration from such truck.

During the additive formulating process as just described, the system will not allow a weight determination of a given additive to be made so long as a panel is removed from the support frame 812 as detected by sensor 858. Nor will a weight determination be made if either one of the motion sensors 853, 854 associated with each weigh hopper detects movement of a weigh hopper that could affect the weight determination to be made in such weigh hopper.

Typically, scale heads 814, 815 receive weight sensings from their respective load cells 6 to 8 times per second. The scale heads then average such readings for that given unit of time and send the average reading via line 826 to the input/output board 818 of the weigh computer 817. Computer 817 then records the averaged weight per unit of time as the weight upon which the computer acts to control the operation of the additive dispensing means and discharge means. Because of the large number of readings being averaged before the average is transmitted to the weigh computer, any single erroneous reading transmitted to a scale head by the load cells will have an insignificant effect on the accuracy of the averaged reading transmitted from the scale head to the weigh computer for processing. This slow updating of the weigh computer (about once per second or less) with an average of a large number of weight sensings received by the scale head is further insurance against inaccurate weight readings and enhances the accuracy of the entire system. If the computer updating were faster (such as twice per second or more), an erroneous reading would have a greater effect on the accuracy of weights recorded and processed by the computer.

FIG. 19 Embodiment

Figure 15:
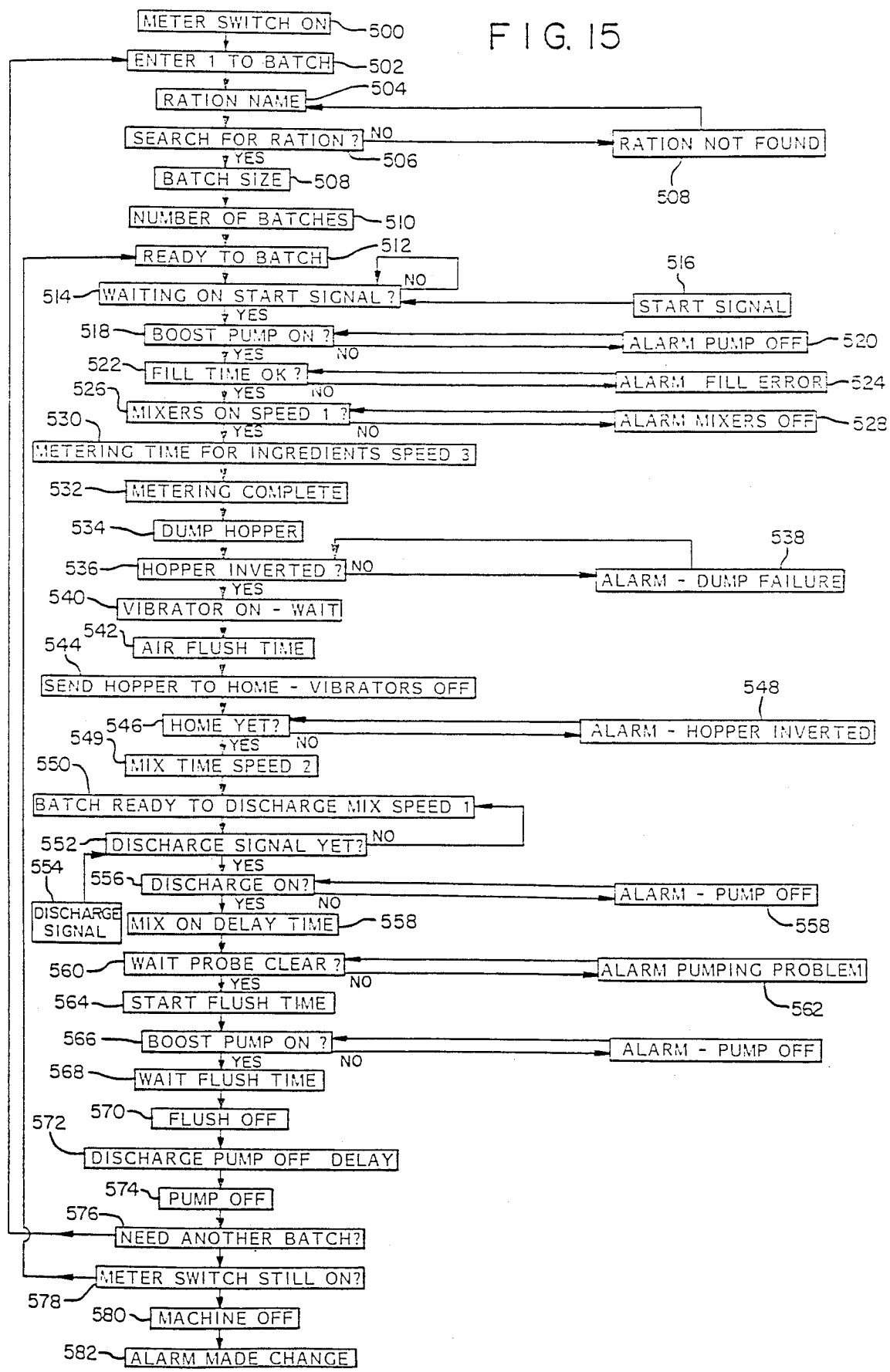
FIG. 15 is a flow diagram illustrating the logic of a computer program which controls alternative volumetric metering and dispensing functions of the illustrated apparatus.
Figure 19:
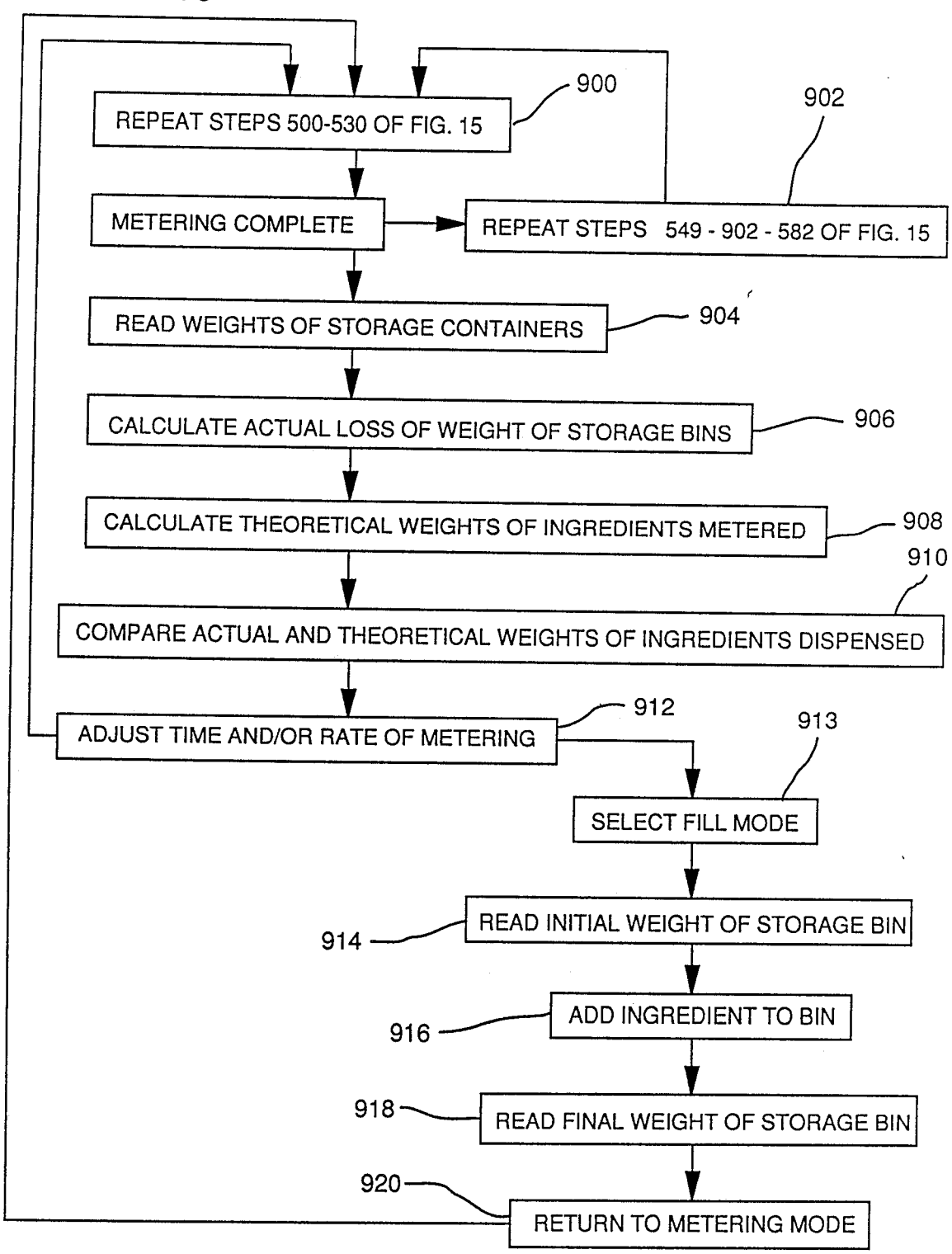
FIG. 19 is a flow diagram illustrating the logic of a modification of the computer program of FIG. 15 which controls a hybrid volumetric-weight system of measuring the amounts of microingredients dispensed using apparatus of the general type shown in FIG. 16.

FIG. 19 is a flowchart of a computer program applicable to the computers of FIG. 14 and representing a modification of the program of FIG. 15 for operating the apparatus of, for example, FIG. 16 on a weight-compensated metering basis.

The flowchart of FIG. 19 incorporates steps 500–530 of the FIG. 15 program in box 900 and also the completion-of-metering step 532 of the same program. When all microingredients have been metered into the mixing vessel 612, the program continues to sequence through steps 549–582 of the metering program of FIG. 15, skipping steps 534–548 because the apparatus of FIG. 16, unlike the apparatus of FIGS. 14 and 18, does not use a weigh hopper.

As the program continues to sequence through mixing and discharge steps 549–582 as indicated at box 902 in FIG. 19, the program also, at least after so many metering cycles, or if desired after every metering cycle, reads the weight of each microingredient storage container 600, 602, 604, 606 as indicated at 904. Thereafter, as indicated at box 906, the program commands the computer to calculate the actual loss of weight of the ingredient storage containers to determine the actual weight of each microingredient metered, by subtracting the weight of each storage container sensed after metering at 904 from the initial weight of each storage container prior to such metering steps.

The program also commands the computer to calculate the theoretical weight loss of each storage container, which is also the theoretical weight of each ingredient used, by multiplying the metering rate of each metering device 610 in, for example, grams per minute, by the length of time each metering device 610 has operated, as indicated at box 908. The program then commands the computer to compare the actual weight of ingredient used as calculated at 906 with the theoretical or target weight of ingredient used as calculated at 908, as indicated at box 910. From this comparison the program commands the computer to adjust either the time that each metering device 610 operates, or the rate of speed at which each such device operates, or both, during a metering cycle so that the actual weight of ingredient used as determined by weighing equals the desired or theoretical weight of ingredient used as determined by metering. This adjustment command occurs at box 912 in the computer program. When the metering speed or time adjustment is made, the program returns to the start of the metering cycle as indicated at box 900.

The program also includes a fill mode or routine which is used whenever a microingredient storage bin 600, 602, 604, 606 is refilled. In such mode, the program commands a reading of the initial weight of the storage container being refilled at box 914. The additional microingredient is then added to the storage container as indicated in box 916. The program then commands a reading of the filled weight of the storage container at box 918 and enters such weight in computer memory. At this point the fill subroutine has been completed and the apparatus is conditioned to start another metering cycle.

The foregoing described program operates the apparatus of FIG. 16 primarily as a metering apparatus. However, the metering devices 610 are adjusted after completion of a predetermined number of metering cycles based on actual loss-of-weight determinations of each storage bin as registered by the weighing means 608 for each storage container. Thus the apparatus of FIG. 16 when operated in accordance with the program of FIG. 19 is actually a hybrid weigh-metering system in which the metering components are periodically readjusted so that the theoretical or target weights of ingredients metered will closely approximate the actual weights of ingredients dispensed.

The described weight-compensated metering system can also be used in a continuous mill application in contrast to the batch mill application described with respect to FIG. 16. In a continuous mill system, the metering devices meter the additive concentrates continuously at predetermined rates from their storage bins into a liquid carrier, which in turn flows into a feed ration at a predetermined rate. In such a system, weight losses of the storage bins can be determined periodically and then used to calculate the necessary adjustments of metering rates of the metering devices to bring the actual weights of additives dispensed per unit of time by metering into line with the theoretical weights desired. This can be done without interruption of metering, simply by adjusting the speed controls of the metering devices.

Having illustrated and described the principles of the invention in several preferred embodiments, it should be apparent to those skilled in the art that the invention can be modified in arrangement and detail without departing from such principles. I claim all modifications coming within the spirit and scope of the following claims.

I claim:

1. An apparatus for measuring, dispensing, and delivering microingredients in small but accurate proportions in a liquid carrier slurry into a livestock or poultry feed ration shortly before the delivery of said feed ration to the animals for consumption, said apparatus comprising:

multiple storage means for storing separately a plurality of different microingredient feed additive concentrates;

a plurality of separate dispensing means, one for each said storage means, for dispensing separately and without intermingling additive concentrates from said multiple storage means;

multiple weigh hopper means in additive-receiving relationship to said plural dispensing means for receiving additives dispensed from said multiple storage means by said plural dispensing means, each said hopper means including hopper discharge means for discharging additives therefrom;

a mixing vessel in additive-receiving relationship to said multiple hopper means for receiving additive concentrates from said multiple hopper means upon operation of said hopper discharge means and for receiving liquid carrier from a remote source;

flow inducing means for inducing a flow of liquid within said mixing vessel;

delivery means for delivering a slurry of liquid carrier and additive concentrates from said mixing vessel to a receiving station for mixing with a feed ration at a location remote from said mixing vessel;

separate weigh means for each said weigh hopper means, said weigh means being operable to determine predetermined weights of additives received in said weigh hopper means delivered to said weigh hopper means by said dispensing means when said predetermined weight of additives have been added to said weigh hopper means.

2. An apparatus according to claim 1 wherein said dispensing means and weigh means associated with each of the multiple weigh hopper means are operable simultaneously such that different additives can be dispensed from said storage means and weighed in said multiple weigh hopper means simultaneously.

3. An apparatus according to claim 2 wherein said discharge means for the multiple weigh hopper means are operable simultaneously to discharge the weighed additives from the multiple weigh hopper means simultaneously into said mixing vessel.

4. An apparatus according to claim 1 wherein said multiple weigh hopper means are mounted on a common support frame means.

5. An apparatus according to claim 4 including isolation means for isolating said support frame means from external vibration inducing forces such that accurate weight determinations can be made within said weigh hopper means.

6. An apparatus according to claim 4 wherein said weigh means for each said weigh hopper means comprises a load cell means suspending said weigh hopper means from said support frame.

7. An apparatus according to claim 6 including isolation means isolating each said load cell means from said support frame means such that the dispensing and weighing of additives within each weigh hopper means is not affected by the dispensing and weighing of additives within the other weigh hopper means during the simultaneous dispensing and weighing of additives within said multiple weigh hopper means.

8. Apparatus according to claim 4 wherein the discharge means for each weigh hopper means includes an electric motor means on said hopper means and said weigh means includes load cell means mounting said weigh hopper means including said electric motor means to said support frame means.

9. Apparatus according to claim 8 including isolator means mounting said load cell means to said support frame means.

10. Apparatus according to claim 9 including panel means enclosing said support frame means to isolate said support frame means and its supported component from external motion-inducing influences.

11. An apparatus according to claim 1 wherein said dispensing means and weigh means associated with a weigh hopper means are operable to dispense and weigh multiple microingredients sequentially within each said weigh hopper means.

12. An apparatus according to claim 11 wherein said dispensing means and weigh means operable to sequentially weigh multiple microingredients within each weigh hopper means are operable simultaneously such that weighing of multiple microingredients within different said weigh hopper means can occur simultaneously.

13. An apparatus according to claim 1 wherein the discharge means for each weigh hopper means is operable independently of the discharge means for the other weigh hopper means such that the multiple hopper means can be discharged simultaneously or at different times.

14. An apparatus according to claim 1 wherein said dispensing means and weigh means for each weigh hopper means are operable to weigh multiple microingredients within the associated weigh hopper means, and said discharge means for each weigh hopper means is operable selectively to either discharge each ingredient from its weigh hopper means before the dispensing of the next microingredient into the same said weigh hopper means or discharge only after an accumulation predetermined weights of at least two microingredients within the same said weigh hopper means.

15. Apparatus according to claim 1 including programmable control means for controlling the operation of said dispensing means, weigh means, flow-inducing means and delivery means, said weigh means including a scale head means operable to receive multiple weight readings within a given time span, average said readings, and transmit said average to said programmable control means within the same said time span and thereby dampen the effects of any erroneous weight readings.

16. Apparatus according to claim 1 including programmable control means for controlling the operation of said dispensing, weigh and discharge means, said programmable control means including program means for selectively operating said dispensing means in conjunction with said weigh means in a weigh mode or independently of said weigh means in a metering mode to dispense said microingredients by volume.

17. A method of dispensing and delivering microingredient feed additives into a livestock feed ration shortly before delivering the feed ration to the livestock for consumption, comprising the steps:

storing separately multiple said additives in concentrate form, including some said additives in solid particulate-concentrate form and at least one of said multiple additives in liquid concentrate form;

dispensing predetermined amounts of selected said solid particulate concentrates by weight into a liquid carrier;

dispensing predetermined amounts of selected said liquid additive concentrates into a liquid carrier by volume;

intermixing the additive concentrates in the liquid carrier, including both the solid particulate additive concentrates and the liquid additive concentrates, to dilute, disperse, and suspend them and form a liquid carrier-additive slurry;

directing the slurry to a receiving station while maintaining the suspension and dispersion of the additives until delivered into a-feed ration.

18. A method of dispensing and delivering microingredient feed additives into a livestock feed ration shortly before delivering the feed ration to the livestock for consumption, comprising the steps:

storing separately multiple said additives in concentrate form;

dispensing predetermined amounts of selected said additive concentrates into a liquid carrier with no substantial intermixing of the additive concentrates before they enter the liquid carrier;

intermixing the additive concentrates in the liquid carrier to dilute, disperse, and suspend them and form a liquid carrier-additive slurry;

directing the slurry to a receiving station while maintaining the suspension and dispersion of the additives until delivered into a feed ration;

determining the predetermined amounts of the selected additives by weighing at least some of the selected additive concentrates dispensed within weighing container means;

before weighing said some of the selected additive concentrates within the weighing container means, detecting an overweight or underweight condition of the weighing container means and (a) if an overweight condition of the weighing container means is detected discharging the container means of any residual ingredients from a preceding dispensing and delivering cycle, and (b) if an underweight condition of the container means is detected, metering the predetermined amounts of said some additive concentrates into the weighing container means on a volumetric basis, and discharging the predetermined amounts of said some concentrates from the weighing container means into the liquid carrier.

* * * * *